US011995951B2

(12) United States Patent
Meyer et al.

(10) Patent No.: US 11,995,951 B2
(45) **Date of Patent: *May 28, 2024**

(54) COMPOSITE METERS FOR ELECTRONIC GAMING MACHINES

(71) Applicant: Aristocrat Technologies Australia Pty Limited, North Ryde (AU)

(72) Inventors: Donovan David Meyer, Austin, TX (US); Thomas Rizos, Austin, TX (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,566

(22) Filed: Oct. 25, 2022

(65) Prior Publication Data

US 2023/0082904 A1 Mar. 16, 2023

Related U.S. Application Data

(63) Continuation of application No. 17/249,983, filed on Mar. 19, 2021, now Pat. No. 11,508,209, which is a continuation of application No. 16/290,639, filed on Mar. 1, 2019, now Pat. No. 10,991,199.

(51) Int. Cl.
*G07F 17/32* (2006.01)
*G07F 17/34* (2006.01)

(52) U.S. Cl.
CPC ...... *G07F 17/3232* (2013.01); *G07F 17/3213* (2013.01); *G07F 17/3227* (2013.01); *G07F 17/34* (2013.01)

(58) Field of Classification Search
CPC .. G07F 17/3213; G07F 17/34; G07F 17/3227; G07F 17/3232
See application file for complete search history.

(56) References Cited

U.S. PATENT DOCUMENTS

| | | | | |
|---|---|---|---|---|
| 11,508,209 | B2 * | 11/2022 | Meyer | G07F 17/3227 |
| 2002/0152120 | A1 * | 10/2002 | Howington | G06Q 30/0224 902/23 |
| 2007/0026936 | A1 * | 2/2007 | Gatto | G07F 17/3276 463/25 |
| 2007/0087834 | A1 * | 4/2007 | Moser | G07F 17/3255 463/42 |
| 2008/0058105 | A1 * | 3/2008 | Combs | G07F 17/32 463/25 |

(Continued)

OTHER PUBLICATIONS

Notice of Allowance dated Dec. 16, 2020 for U.S. Appl. No. 16/290,639 (pp. 1-7).

(Continued)

*Primary Examiner* — Steve Rowland
(74) *Attorney, Agent, or Firm* — Weaver Austin Villeneuve & Sampson LLP

(57) ABSTRACT

Systems and techniques for providing flexibly reconfigurable meters on electronic gaming machines are provided; such meters may be considered to be "transient" with respect to meters that are hard-coded into the electronic gaming machine operating system or platform software or wagering game software and may be reconfigured by updating one or more meter definition files. Some such electronic gaming machines may provide for automated output of meter information.

20 Claims, 9 Drawing Sheets

(56) References Cited

U.S. PATENT DOCUMENTS

| | | | | |
|---|---|---|---|---|
| 2008/0305844 | A1* | 12/2008 | Davis | G07F 17/3234 463/1 |
| 2009/0172035 | A1* | 7/2009 | Lessing | G06Q 30/02 |
| 2010/0124980 | A1* | 5/2010 | Acres | G07F 17/3239 463/20 |

OTHER PUBLICATIONS

"Technical Standard for Gaming Devices and Associated Equipment," Standard 2: Proper Accounting for Gaming Devices. Feb. 15, 2016, 5 pages.

Office Action dated Jul. 28, 2020 for U.S. Appl. No. 16/290,639 (pp. 1-9).

Office Action (Non-Final Rejection) dated Feb. 1, 2022 for U.S. Appl. No. 17/249,983 (pp. 1-7).

Office Action (Notice of Allowance and Fees Due (PTOL-85)) dated Jul. 7, 2022 for U.S. Appl. No. 17/249,983 (pp. 1-7).

Office Action (Notice of Allowance and Fees Due (PTOL-85) dated Jul. 21, 2022 for U.S. Appl. No. 17/249,983 (pp. 1-3).

Office Action (Notice of Allowance and Fees Due (PTOL-85)) dated Oct. 24, 2022 for U.S. Appl. No. 17/249,983 (pp. 1-6).

* cited by examiner

COMPOSITE METERS FOR ELECTRONIC GAMING MACHINES

RELATED APPLICATION

This application is a continuation application under 35 U.S.C. § 120 of U.S. patent application Ser. No. 17/249,983, filed Mar. 19, 2021, and titled "COMPOSITE METERS FOR ELECTRONIC GAMING MACHINES," which is itself a continuation of U.S. patent application Ser. No. 16/290,639, filed Mar. 1, 2019, and titled "COMPOSITE METERS FOR ELECTRONIC GAMING MACHINES," which issued as U.S. Pat. No. 10,991,199 on Apr. 27, 2021, both of which are hereby incorporated by reference herein in their entireties and for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Electronic gaming machines are provided that feature flexibly reconfigurable meters for monitoring gaming machine or wagering game events. In a traditional electronic gaming machine, meters may be provided as part of the electronic gaming machine operating system and/or platform software or as part of the wagering game software. Electronic gaming machines according to this disclosure, however, may feature the ability to obtain meter definitions from a separate file or files that may be easily replaced without changing the electronic gaming machine operating system and/or platform software or the wagering game software. During meter initialization, such gaming machines may reference the meter definitions set forth in the meter definition file or files and instantiate various "transient" meters, in addition to the "non-transient" meters that are hard-coded into the electronic gaming machine operating system and/or platform software or the wagering game software and that cannot be changed without recompiling the electronic gaming machine operating system and/or platform software or the wagering game software.

Electronic gaming machines are typically configured to store significant amounts of historical data for non-transient meters for regulatory and/or dispute resolution purposes. In contrast, gaming machines may be configured to store either no historical records for transient meters or a much lower number of such historical records for transient meters. Transient meters, for example, may be used to track events on a gaming machine that may be of little or no interest from a regulatory and/or operator standpoint, but which may be of interest to gaming machine manufacturers and/or wagering game developers. Such data may indicate nuances of wagering game play that may help more intelligently drive wagering game development and/or electronic gaming machine developments. In some instances, electronic gaming machines may be configured to communicate meter information using various machine-readable codes, e.g., QR codes, that may be visible on one or more displays of the gaming machine under at least some circumstances; in some such instances, such codes may be displayed in a manner that makes them invisible to human observers but readily accessible to electronic image capture systems that operate at a higher refresh rate than the human eye. These and other aspects of the disclosure are presented in more detail below.

In some implementations, an electronic gaming machine may be provided that includes one or more displays, one or more credit input devices, one or more credit output devices, one or more player input devices, one or more processors, one or more storage devices, and one or more memory devices. In such an electronic gaming machine, the one or more displays, the one or more credit input devices, the one or more credit output devices, the one or more player input devices, the one or more processors, the one or more storage devices, and the one or more memory devices may be operably connected, and the one or more storage devices may store computer-executable instructions for controlling the one or more processors to cause the one or more processors to: present one or more wagering games using the one or more displays, operate the one or more wagering games responsive to inputs received by the one or more player input devices, initialize one or more first meters, and monitor activity on the electronic gaming machine for the occurrence of any of a plurality of different types of gaming system events (the types of gaming system events may include a first set of types of electronic gaming system events and a second set of types of gaming system events). The one or more storage devices may store further computer-executable instructions for controlling the one or more processors to cause, responsive to each occurrence of any of the types of gaming system events in the first set, the one or more processors to: update a value or values of the at least one of the one or more first meters based on the occurrence of that type of gaming system event, and add, responsive to updating the value or values of the at least one of the one or more first meters, one or more first records to a data structure stored on the one or more storage devices (the one or more first records may be each associated with one of the at least one of the one or more first meters). The one or more storage devices may also store further computer-executable instructions for controlling the one or more processors to cause the one or more processors to: obtain one or more meter definitions from one or more meter definition files, each meter definition associated with a corresponding second meter and defining a corresponding rule for determining a value for the corresponding second meter, initialize the one or more second meters defined by the one or more meter definitions, update a value or values of the at least one second meter of the one or more second meters based on each occurrence of any of the types of gaming system events in the second set and based on the corresponding meter definition or definitions for the at least one second meter of the one or more second meters, and provide output indicative of the values of the one or more second meters.

In some implementations of the electronic gaming machine, the first set and the second set may include at least some types of gaming system events in common.

In some implementations of the electronic gaming machine, the one or more storage devices may further store computer-executable instructions for further controlling the one or more processors to: receive a request to output the values for the at least one second meter of the one or more second meters, and update, responsive to receiving the request, the value or values of the at least one second meter of the one or more second meters based on each occurrence of any of the types of gaming system events in the second set and based on the corresponding meter definition or definitions for the at least one second meter of the one or more second meters using, at least, in part, one or more values for the one or more first meters.

In some such implementations, the one or more storage devices may further store computer-executable instructions for further controlling the one or more processors to update, responsive to receiving the request, the value or values of the at least one second meter of the one or more second meters based on each occurrence of any of the types of gaming system events in the second set and based on the corresponding meter definition or definitions for the at least one second meter of the one or more second meters using, at least, in part, one or more values for the one or more first meters retrieved from the one or more first records from the data structure.

In some alternative or additional such implementations, the one or more storage devices further store computer-executable instructions for further controlling the one or more processors to cause, responsive to each occurrence of any of the types of gaming system events in the second set, the one or more processors to update the value or values of the at least one second meter of the one or more second meters based on the occurrence of that type of gaming system event.

In some further implementations, each first record may store data such as a value of one of the first meters immediately prior to being updated, the value of one of the first meters immediately after being updated, or a difference between the value of the one of the first meters immediately prior to and after being updated.

In some additional implementations, the one or more storage devices may further store computer-executable instructions for further controlling the one or more processors to: store up to an average maximum of M first records associated with each of the first meters; and store up to an average maximum of N second records associated with each of the second meters. In such implementations, M may be a positive integer, N may be a non-negative integer, and N may be less than M. In some implementations, N may equal 0. In some additional or alternative implementations, M may be greater than 10, 20, 30, 50, or 100. In some additional or alternative implementations, N may be less than $$\frac{M}{2}.$$

In some implementations, at least some of the types of gaming system events may be events such as a hardware failure event, a tamper alarm state change, a door sensor alarm state change, a credit input event, a credit output event, a credit award event, a non-monetary award event, a ticket printing event, a player loyalty program login event, a random number generator outcome, a denomination selection event, a wager amount selection event, a payline selection event, a spin event, a game outcome event, a bonus game event, a player selection of a particular symbol, a player selection of a particular reel stop, occurrence of a predefined winning pattern, occurrence of a predefined set of winning patterns, a winning event with a payout above a first predetermined threshold, a player selection of a double-up, a player selection take win from a double-up win, a player selection of a bonus award type, a player selection to stop the reels, a player selection of a system volume setting, a player selection of a particular game, a player selection of an individual line bet, a player selection of a help screen, or a player selection of a pays screen.

In some additional or alternative implementations, the value of each second meter may be ultimately derivable from the values of one or more of the first meters.

In some additional or alternative implementations, none of the values for the first meters may be unambiguously derived from any one or more of the values for the other first meters, and the value of each second meter may be ultimately derivable from the values of one or more of the first meters.

In some additional or alternative implementations, the one or more second meter configuration files may be in an XML format.

In some additional or alternative implementations, the computer-executable instructions for controlling the one or more processors to provide the output indicative of the values of the one or more second meters may include instructions for controlling the one or more processors to provide the output indicative of the values of the one or more second meters through a technique selected from the group consisting of: a) formatting the output using a steganographic technique to produce steganographic content and then displaying the steganographic content on one of the one or more displays, b) transmitting the output through a wireless interface of the electronic gaming machine, c) encoding the output into an audio signal and then causing one or more speakers of the electronic gaming machine to generate the audio signal, d) encoding the output into one or more quick-read (QR) codes and displaying the one or more QR codes on one of the one or more displays, e) encoding the output into one or more optical labels and displaying the one or more optical labels on one of the one or more displays, f) encoding the output into one or more quick-read (QR) codes and displaying the one or more QR codes on one of the one or more displays in alternating colors in successive frames of graphical output, or g) encoding the output into one or more optical labels and displaying the one or more optical labels on one of the one or more displays in alternating colors in successive frames of graphical output.

In some implementations, a method may be provided that includes presenting one or more wagering games using one or more displays of an electronic gaming machine, operating the one or more wagering games responsive to inputs received by one or more player input devices, initializing one or more first meters, and monitoring activity on the electronic gaming machine for the occurrence of any of a plurality of different types of gaming system events (the types of gaming system events may include a first set of types of gaming system events and a second set of types of gaming system events). The method may further include, for each occurrence of any of the types of gaming system events in the first set: updating a value or values of the at least one of the one or more first meters based on the occurrence of that type of gaming system event, and adding, responsive updating the value or values of the at least one of the one or more first meters, one or more first records to a data structure stored on the one or more storage devices (the one or more first records may each be associated with one of the at least one of the one or more first meters). The method may also include obtaining one or more second meter definitions from one or more second meter definition files, each second meter definition associated with a corresponding second meter and defining a corresponding rule for determining a value for the corresponding second meter, initializing the one or more second meters defined by the one or more second meter definitions, updating a value or values of the at least one second meter of the one or more second meters based on each occurrence of any of the types of gaming system events in the second set and based on the corresponding meter definition or definitions for the at least one second meter of the one or more second meters, and providing output indicative of the values of the one or more second meters.

In some implementations of the method, the first set and the second set may include at least some types of gaming system events in common.

In some implementations of the method, the method may further include receiving a request to output the values for the at least one second meter of the one or more second meters, and updating, responsive to receiving the request, the value or values of the at least one second meter of the one or more second meters based on each occurrence of any of the types of gaming system events in the second set and based on the corresponding meter definition or definitions for the at least one second meter of the one or more second meters using, at least, in part, one or more values for the one or more first meters.

In some such implementations of the method, the method may further include updating, responsive to receiving the request, the value or values of the at least one second meter of the one or more second meters based on each occurrence of any of the types of gaming system events in the second set and based on the corresponding meter definition or definitions for the at least one second meter of the one or more second meters using, at least, in part, one or more values for the one or more first meters retrieved from the one or more first records from the data structure In some additional or alternative such implementations of the method, the method may further include updating, responsive to each occurrence of any of the types of gaming system events in the second set, the value or values of the at least one second meter of the one or more second meters based on the occurrence of that type of gaming system event.

In some additional implementations of the method, each first record stores data such as a value of one of the first meters immediately prior to being updated, the value of one of the first meters immediately after being updated, or a difference between the value of the one of the first meters immediately prior to and after being updated.

In some additional or alternative implementations of the method, the method may further include storing up to an average maximum of M first records associated with each of the first meters and storing up to an average maximum of N second records associated with each of the second meters. In such an implementation, M may be a positive integer, N may be a non-negative integer, and N may be less than M.

In some additional or alternative implementations of the method, N may be 0.

In some additional or alternative implementations of the method, M may be greater than 10, 20, 30, 50, or 100.

In some additional or alternative implementations of the method, N may be less than $$\frac{M}{2}.$$

In some additional or alternative implementations of the method, at least some of the types of gaming system events may be events such as a hardware failure event, a tamper alarm state change, a door sensor alarm state change, a credit input event, a credit output event, a credit award event, a non-monetary award event, a ticket printing event, a player loyalty program login event, a random number generator outcome, a denomination selection event, a wager amount selection event, a payline selection event, a spin event, a game outcome event, a bonus game event, a player selection of a particular symbol, a player selection of a particular reel stop, occurrence of a predefined winning pattern, occurrence of a predefined set of winning patterns, a winning event with a payout above a first predetermined threshold, a player selection of a double-up, a player selection take win from a double-up win, a player selection of a bonus award type, a player selection to stop the reels, a player selection of a system volume setting, a player selection of a particular game, a player selection of an individual line bet, a player selection of a help screen, or a player selection of a pays screen.

In some additional or alternative implementations of the method, the value of each second meter may be ultimately derivable from the values of one or more of the first meters.

In some additional or alternative implementations of the method, none of the values for the first meters may be unambiguously derived from any one or more of the values for the other first meters, and the value of each second meter may be ultimately derivable from the values of one or more of the first meters.

In some additional or alternative implementations of the method, the one or more second meter configuration files may be in an XML format.

In some additional or alternative implementations of the method, the output indicative of the values of the one or more second meters may be provided through a technique such as: a) formatting the output using a steganographic technique to produce steganographic content and then displaying the steganographic content on one of the one or more displays, b) transmitting the output through a wireless interface of the electronic gaming machine, c) encoding the output into an audio signal and then causing one or more speakers of the electronic gaming machine to generate the audio signal, d) encoding the output into one or more quick-read (QR) codes and displaying the one or more QR codes on one of the one or more displays, e) encoding the output into one or more optical labels and displaying the one or more optical labels on one of the one or more displays, f) encoding the output into one or more quick-read (QR) codes and displaying the one or more QR codes on one of the one or more displays in alternating colors in successive frames of graphical output, or g) encoding the output into one or more optical labels and displaying the one or more optical labels on one of the one or more displays in alternating colors in successive frames of graphical output.

In some implementations, a machine-readable, non-transitory memory device may be provided that stores computer-executable instructions for controlling one or more processors to cause the one or more processors to: present one or more wagering games using one or more displays of an electronic gaming machine, operate the one or more wagering games responsive to inputs received by the one or more player input devices, initialize one or more first meters, and monitor activity on the electronic gaming machine for the occurrence of any of a plurality of different types of gaming system events (the types of gaming system events may include a first set of types of gaming system events and a second set of types of gaming system events). The machine-readable, non-transitory memory device may further store additional computer-executable instructions for controlling the one or more processors to cause, for each occurrence of any of the types of gaming system events in the first set, the one or more processors to update a value or values of the at least one of the one or more first meters based on the occurrence of that type of gaming system event, and add, responsive to updating the value or values of the at least one of the one or more first meters, one or more first records to a data structure stored on the one or more storage devices (the one or more first records may each be associated with one of the at least one of the one or more first meters). The machine-readable, non-transitory memory device may further store additional computer-executable instructions for controlling the one or more processors to obtain one or more meter definitions from one or more meter definition files, each meter definition associated with a corresponding second meter and defining a corresponding rule for determining a value for the corresponding second meter, initialize the one or more second meters defined by the one or more meter definitions, update a value or values of the at least one second meter of the one or more second meters based on each occurrence of any of the types of gaming system events in the second set and based on the corresponding meter definition or definitions for the at least one second meter of the one or more second meters, and provide output indicative of the values of the one or more second meters.

In some implementations, the first set and the second set may include at least some types of gaming system events in common.

In some implementations, the machine-readable, non-transitory memory device may further store additional computer-executable instructions for controlling one or more processors to cause the one or more processors to receive a request to output the values for the at least one second meter of the one or more second meters and update, responsive to receiving the request, the value or values of the at least one second meter of the one or more second meters based on each occurrence of any of the types of gaming system events in the second set and based on the corresponding meter definition or definitions for the at least one second meter of the one or more second meters using, at least, in part, one or more values for the one or more first meters.

In some such implementations, the machine-readable, non-transitory memory device may further store additional computer-executable instructions for controlling one or more processors to cause the one or more processors to update, responsive to receiving the request, the value or values of the at least one second meter of the one or more second meters based on each occurrence of any of the types of gaming system events in the second set and based on the corresponding meter definition or definitions for the at least one second meter of the one or more second meters using, at least, in part, one or more values for the one or more first meters retrieved from the one or more first records from the data structure.

In some additional or alternative such implementations, the machine-readable, non-transitory memory device may further store additional computer-executable instructions for controlling one or more processors to cause the one or more processors to cause, responsive to each occurrence of any of the types of gaming system events in the second set, the one or more processors to update the value or values of the at least one second meter of the one or more second meters based on the occurrence of that type of gaming system event.

In some additional implementations of the machine-readable, non-transitory memory device, each first record may store data such as a value of one of the first meters immediately prior to being updated, the value of one of the first meters immediately after being updated, or a difference between the value of the one of the first meters immediately prior to and after being updated.

In some additional or alternative implementations of the machine-readable, non-transitory memory device, the machine-readable, non-transitory memory device may further store additional computer-executable instructions for controlling one or more processors to cause the one or more processors to: store up to an average maximum of M first records associated with each of the first meters and store up to an average maximum of N second records associated with each of the second meters. In such implementations, M may be a positive integer, N may be a non-negative integer, and N may be less than M.

In some additional or alternative implementations of the machine-readable, non-transitory memory device, N may equal 0.

In some additional or alternative implementations of the machine-readable, non-transitory memory device, M may be greater than 10, 20, 30, 50, or 100.

In some additional or alternative implementations of the machine-readable, non-transitory memory device, N may be less than $$\frac{M}{2}.$$

In some additional or alternative implementations of the machine-readable, non-transitory memory device, at least some of the types of gaming system events may be events such as: a hardware failure event, a tamper alarm state change, a door sensor alarm state change, a credit input event, a credit output event, a credit award event, a non-monetary award event, a ticket printing event, a player loyalty program login event, a random number generator outcome, a denomination selection event, a wager amount selection event, a payline selection event, a spin event, a game outcome event, a bonus game event, a player selection of a particular symbol, a player selection of a particular reel stop, occurrence of a predefined winning pattern, occurrence of a predefined set of winning patterns, a winning event with a payout above a first predetermined threshold, a player selection of a double-up, a player selection take win from a double-up win, a player selection of a bonus award type, a player selection to stop the reels, a player selection of a system volume setting, a player selection of a particular game, a player selection of an individual line bet, a player selection of a help screen, or a player selection of a pays screen.

In some additional or alternative implementations of the machine-readable, non-transitory memory device, the value of each second meter may be ultimately derivable from the values of one or more of the first meters.

In some additional or alternative implementations of the machine-readable, non-transitory memory device, none of the values for the first meters may be unambiguously derived from any one or more of the values for the other first meters, and the value of each second meter may be ultimately derivable from the values of one or more of the first meters.

In some additional or alternative implementations of the machine-readable, non-transitory memory device, the one or more second meter configuration files may be in an XML format.

In some additional or alternative implementations of the machine-readable, non-transitory memory device, the computer-executable instructions for controlling the one or more processors to provide the output indicative of the values of the one or more second meters may include instructions for controlling the one or more processors to provide the output indicative of the values of the one or more second meters through a technique such as: a) formatting the output using a steganographic technique to produce steganographic content and then displaying the steganographic content on one of the one or more displays, b) transmitting the output through a wireless interface of the electronic gaming machine, c) encoding the output into an audio signal and then causing one or more speakers of the electronic gaming machine to generate the audio signal, d) encoding the output into one or more quick-read (QR) codes and displaying the one or more QR codes on one of the one or more displays, e) encoding the output into one or more optical labels and displaying the one or more optical labels on one of the one or more displays, f) encoding the output into one or more quick-read (QR) codes and displaying the one or more QR codes on one of the one or more displays in alternating colors in successive frames of graphical output, or g) encoding the output into one or more optical labels and displaying the one or more optical labels on one of the one or more displays in alternating colors in successive frames of graphical output.

DETAILED DESCRIPTION

Figure 1:
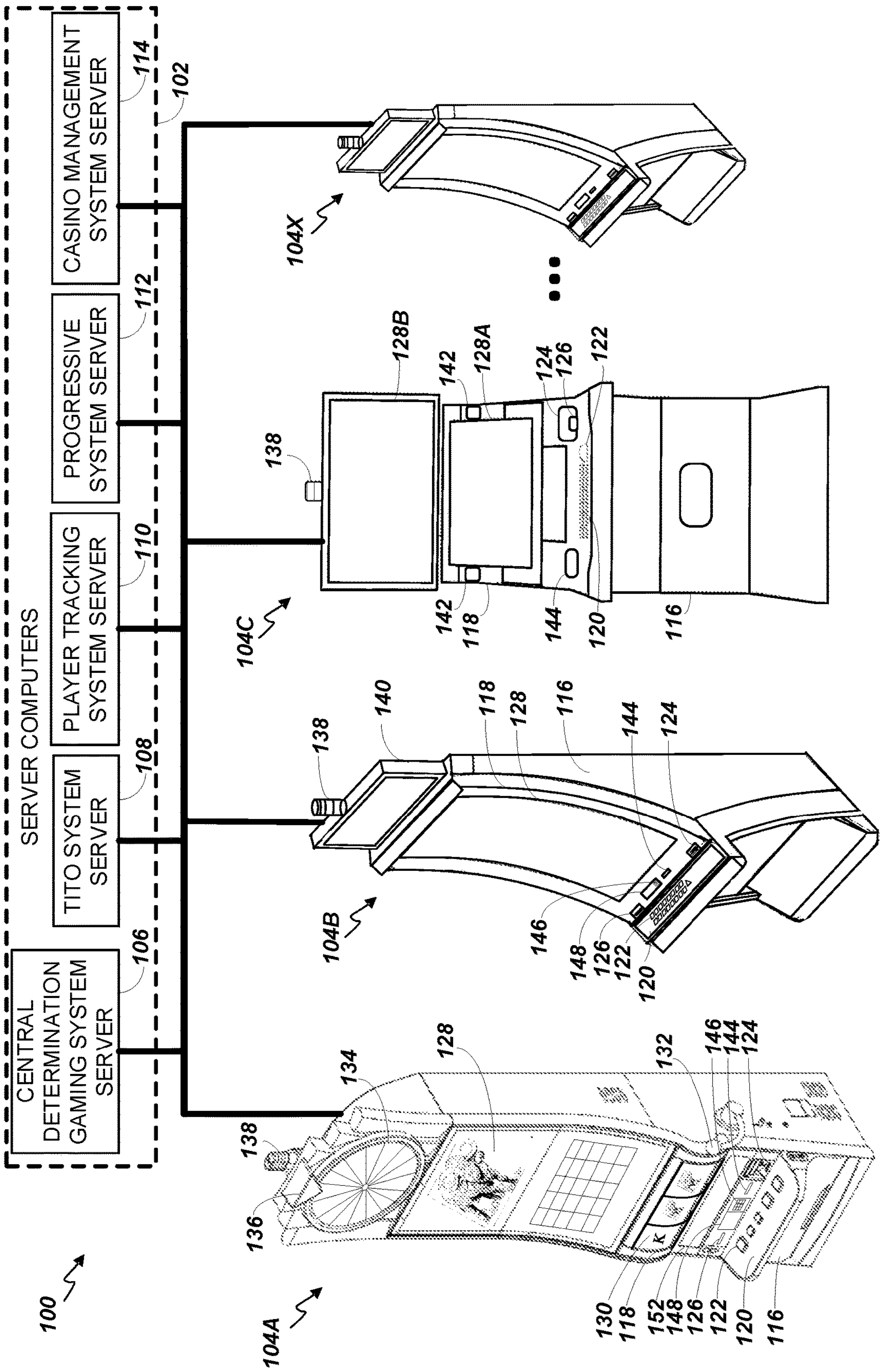
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
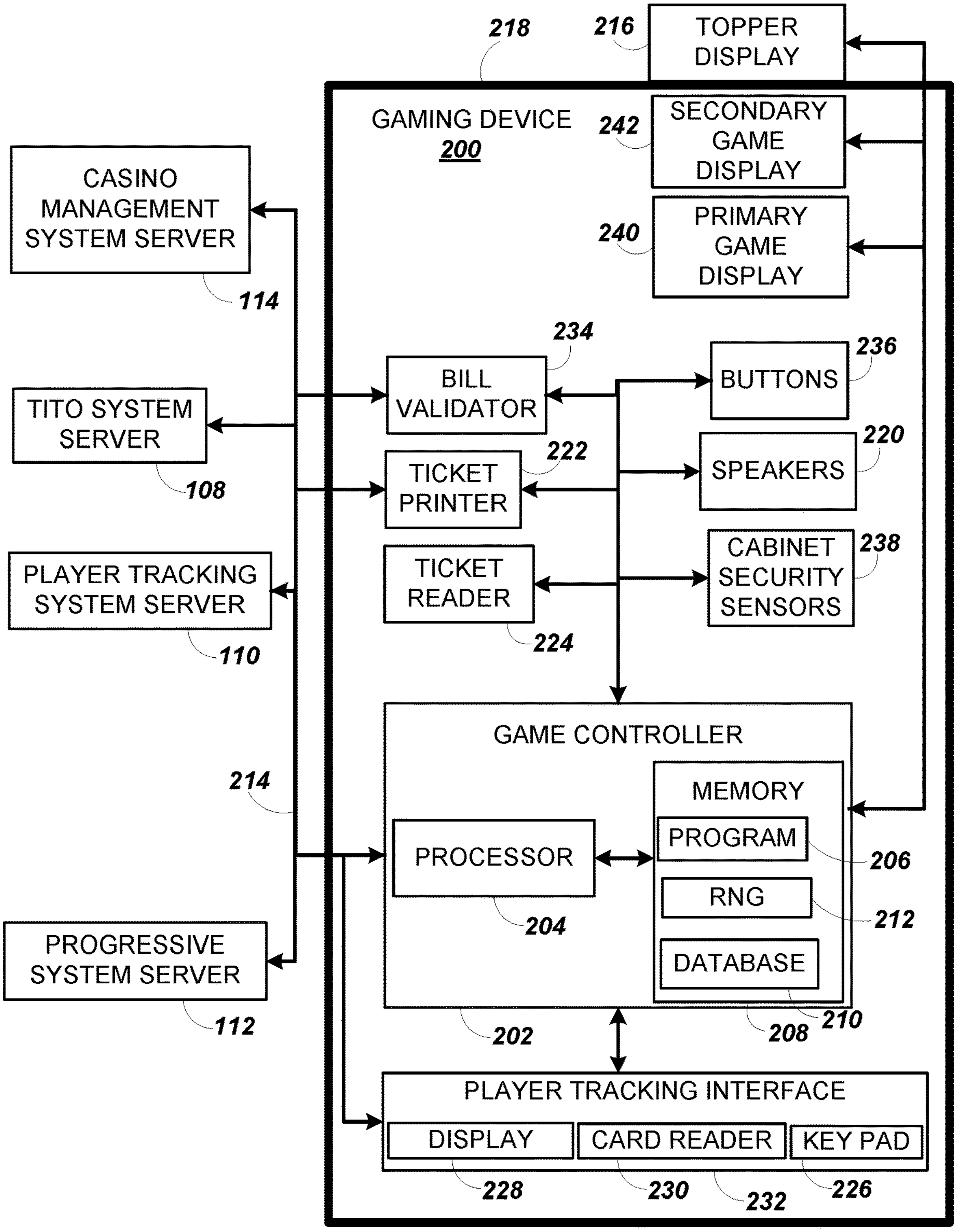
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide new technology in that they allow for a much larger number of meters for monitoring electronic gaming machine performance to be tracked, as well as allowing for meters to be flexibly redefined without needing to update the platform or operating system software or wagering game software for an electronic gaming machine. Some implementations may provide new mechanisms for conveying meter data out of an electronic gaming machine, facilitating the collection of information that may be of particular interest to gaming machine manufacturers and wagering game designers. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Electronic gaming machines are typically configured to track a multitude of different parameters during operation using various meters, including, for example, electronic gaming machine events and wagering game events, which may be referred to herein collectively as gaming system events. Events that are tracked in some way by a meter of an electronic gaming machine may be referred to herein as "meterable" events.

Electronic gaming machine events may, for example, be events relating to various hardware-level or game-independent events of interest, such as a hardware failure event, the opening or closing of a maintenance door or other access route into the gaming machine (as indicated by a door sensor alarm state change), the activation of a tamper detection sensor, the presence of a player or onlooker (as registered by a motion sensor, seat occupancy sensor, or other mechanism), input of credits into the gaming machine (e.g., via a bill acceptor, credit card reader, voucher reader, or other mechanism), output of credits from the gaming machine (e.g., via a ticket or voucher printer or other mechanism), number of times particular amounts were wagered, amounts won or lost on each wager, credit award events, non-monetary award events (such as an award of an in-game consumable, such as a wild card token or score-doubling token, or an award that is not monetary but is unrelated to game play, e.g., a car, a phone, a game console, a voucher for a free meal at a restaurant, tickets for a performance, etc.), the play of a game, random number generator output (which may be used by wagering for the purposes of determining wagering game outcomes but which may be provided by the electronic gaming machine regardless of which particular game is being provided), a ticket printing event, a player loyalty program login event (such as when a player logs into or out of a loyalty system using the gaming machine), a denomination selection event (such as when a player selects a particular denomination to use in a wagering game), a wager amount selection event, a payline selection event, a spin event, a game outcome event, a bonus game event, a player selection of a particular symbol (for example, a player may be allowed to select a particular symbol and any instances of that symbol appearing on the reels at that time may be "frozen" for the next spin/game), a player selection of a particular reel stop, occurrence of a predefined winning pattern, occurrence of a predefined set of winning patterns, a winning event with a payout above a first predetermined threshold, a player selection of a double-up (for example, a player may be presented with an opportunity to "double up" their winnings for a game play by making an additional wager using those winnings; if they win the subsequent wager, they will double their winnings, but if they lost the subsequent wager, they will lose those winnings), a player selection take win from a double-up win (in some double-up game features, a player may be allowed to double-up multiple times, potentially exponentially increasing their winnings; however, a more cautious player may elect to forego a further chance to double up and instead elect to take the increased winnings resulting from one or more prior successful double-up engagements), a player selection of a bonus award type, a player selection to stop the reels, a player selection of a system volume setting, a player selection of a particular game, a player selection of an individual line bet, a player selection of a help screen, or a player selection of a pays screen.

Wagering game events may, for example, be events relating to a particular wagering game that may be of interest, such as player inputs that affect game play (such as payline selections, denomination selections, selections of a particular symbol, etc.), the occurrence of specific payline symbol combinations, the occurrence of any of several specific payline symbol combinations in a set of payline symbol combinations, the occurrence of various in-game events, etc.

In a typical electronic gaming machine, events of interest may be tracked using pre-defined "meters"; each such meter is associated with a current value as well as with a history of past values (or information that allows such past values to be determined). Such meters may be in the form of an incremental meter, a running total meter, or a percentage meter. For example, an incremental meter may simply increment by one unit each time a particular event associated with that meter occurs, e.g., a "door open" event may cause a meter that indicates "door open" events to increment by one. A running total meter may increment (or decrement) by an amount associated with an associated event, e.g., a credit input meter may be incremented each time credit is input to an electronic gaming machine by the amount of the credit input (for example, if 5 credits are input in an electronic gaming machine, a credit input meter may be incremented by 5 units in response to detection of such an event). A percentage meter may reflect, for example, a total value associated with one or more events relative to a total value associated with one or more other events, e.g., an RTP (return-to-player) meter may reflect the total amount of credits paid out by an electronic gaming machine over a defined time interval divided by the total amount of credits input into that electronic gaming machine over that same defined time interval. In some implementations, timestamp information for each event that causes a meter update (or for each meter update) may be saved as well for future reference, e.g., to allow for a determination of how long it has been since each meter was last updated or when meter update events for different meters occurred relative to one another.

Example meters that may be provided in electronic gaming machines may include, for example, meters that monitor the total number (and total cash value) of cashable vouchers that are input into the electronic gaming machine, the total number (and total cash value) of cashable promotional vouchers that are input into the electronic gaming machine, the total number (and total cash value) of non-cashable promotional vouchers that are input into the electronic gaming machine, the total number (and total cash value) of cashable vouchers that printed out by the electronic gaming machine, the total number (and total cash value) of promotional cashable vouchers that printed out by the electronic gaming machine, the total number (and total cash value) of non-cashable promotional vouchers that printed out by the electronic gaming machine, the total number of credits input into the electronic gaming machine, the total number of credits paid out by the electronic gaming machine, the total number of credits wagered or played in wagering games provided by the electronic gaming machine, the total number of credits won by players in wagering games provided by the electronic gaming machine, the total number of games or games of a particular type played on the electronic gaming machine, the total number of games or games of a particular type played on the electronic gaming machine since a reboot of the electronic gaming machine, the total number of games or games of a particular type played on the electronic gaming machine since a door close event was detected (which may indicate the number of game plays since the electronic gaming machine was last serviced), and the total number of games or games of a particular type played on the electronic gaming machine in which the player won at least some amount or an amount over a predefined threshold.

The histories of past meter values are maintained for auditing purposes to comply with various regulatory requirements, e.g., in case of a player dispute regarding an outcome (or lack thereof), the meter histories may be referenced to show relevant states of the electronic gaming machine for one or more past gaming system events on the electronic gaming machine. In a modern electronic gaming machine, such as those offering multiple wagering games or wagering game variants, separate sets of meters (and the corresponding histories of meter values or events associated therewith) may be maintained for each such wagering game or wagering game variant offered or playable on the electronic gaming machine. There are typically on the order of 20-30 meters, minimum, required by most gaming regulatory agencies (for example, Technical Standard 2, incorporated herein by reference with respect to the extent to which it discusses meters and adopted by the Nevada Gaming Control Board and Gaming Commission specify at least 25 different types of information that are required to be tracked by electronic digital storage meters; each such meter must be capable of storing at least 10 digits of information, and a minimum of 34 historical data records must be retained for each meter—and storage of additional historical records is "encouraged" by the technical standards) for each game offered on an electronic gaming machine. Additionally, meters (and historical data therefore) are typically required, e.g., per the technical standard referenced earlier, to retain their most recent values for at least 72 hours in the event of a power failure.

For various reasons, meters and the historical data storage therefor have traditionally been implemented using non-volatile random access memory (NVRAM), which is a type of solid state memory that is extremely fast and does not lose the data stored therein during a power loss. NVRAM, however, is among the most expensive commercially available memories on a price/unit storage basis—for example, a 1 MB NVRAM module may cost between $25 to $30, depending on the number purchased (for example, the Maxim DS1245Y-85+ NVRAM chip with a 1 MB capacity may be purchased through www.mouser.com for ~$35 as of the filing date of this disclosure, with prices dropping to ~$26 per module for purchases of 50 to 999 modules). While hard disks may offer a far more cost-effective storage solution, they are ill-suited for use in the electronic gaming machine context since they a) include moving parts that limit their read/write speed and are much more likely to suffer mechanical failure than solid-state mechanisms, b) are susceptible to shock or overheating (electronic gaming machines may be subjected to shock events during installation/movement, or during play of a game if a player becomes violent and physically tries to damage a gaming machine out of frustration; at the same time, the environment in casinos is typically non-ideal for computing devices—electronic gaming machines are typically powered and running 24 hours a day, seven days a week, and there is constant pedestrian traffic that creates significant amounts of particulate debris (carpet fibers, clothing fibers, hair, skin cells, food particles, cigarette smoke, and dust—in Nevada, in particular, there can be large amounts of dust given the desert environment) that tends to accumulate in the interiors of electronic gaming machines, interfering with cooling systems and generally increasing the potential for failure of electronic devices—especially those with moving parts. The information stored in meters is also constantly being updated with new information with each play of a wagering game on an electronic gaming machine—this can result in significant wear and tear on a hard disk. For example, it may be typical for an electronic gaming machine to see on the order of 600 spins (or plays of a wagering game) per hour when in use, each of which will require that data be written to the hard disk (assuming one is used). Every such write event will subject the moving parts of the hard disk to wear and tear, impacting its eventual service life and increasing the chance of an eventual failure. Hard disks are also, as noted earlier, much slower than NVRAM—this speed penalty is particularly evident when writing small amounts of data, such as meter values. This is because hard drive read/write operations are have durations that are governed by two primary types of actions: actions necessary to locate the read/write location and position the various moving parts so that the read/write head aligns with the read/write location and then actions necessary to actually read/write the data to that location. The former actions are limited by the speed of the platter (which must rotate until the read-write location on the platter is aligned with where the read/write head will be) and the speed with which the read/write head can be positioned at the correct radial location relative to the platter; the mechanical delay associated with these operations is typically the same regardless of the size of the data being written or read. The duration of the latter actions, however, is primarily a function of the amount of data being written or read. Thus, the mechanical delay tends to dominate performance for small-size, e.g., <4 kilobytes, data write operations, and becomes a much less significant factor for larger-size data write operations. For example, a typical hard drive might have average write speeds of greater than 80 to 160 megabytes per second for large, 1 GB files, but could have average write speeds of only 1.5 megabytes per second for files of 4 kilobytes or less in size (50 to 100 times slower than for large files). For these reasons (and perhaps others not discussed above), electronic gaming machine manufacturers do not use large-size hard disks, and have traditionally been limited to using small-size NVRAM modules that are typically soldered onto the motherboards or other printed circuit boards within the electronic gaming machines. For cost reasons, such NVRAM modules were typically relatively limited in size, e.g., 512 kilobytes, 1 megabyte, and perhaps up to 4, 8, or 16 megabytes in some instances (a 16 megabyte NVRAM module, for example retails for ~$300 as of the time of this disclosure). This has necessarily limited, and continues to limit, the amount of historical meter data that can be stored on such non-volatile memory, making it difficult to expand the number of meters and associated historical data that are tracked by a particular electronic gaming machine. While additional NVRAM could be added to the electronic gaming machine, doing so incurs a cost penalty, as NVRAM is so much more expensive than other types of memory.

In recent products, manufacturers have started exploring using other types of solid-state non-volatile memory, such as solid state drives or compact flash memory. While both of these types of non-volatile memory may offer less expensive alternatives to NVRAM and are considerably faster and more reliable than hard drives, they are still typically slower in performance than NVRAM. However, given the continued improvement in such technologies, usage of solid state drives, compact flash, or similar solid-state non-volatile memory devices is expected to increase in coming years, leading to a general, and significant, increase in the amount of non-volatile memory available for storage of historical meter data (or current meter data, for that matter). At the same time, however, electronic gaming machines are evolving to become more and more complex, offering, for example, multiple different types of wagering games that may be selected by a player for play and/or different versions of each wagering game offered for play by the electronic gaming machine, e.g., a different version for each of a plurality of different denominations. For example, a particular slot machine game may allow players to place bets of 1 credit, 2 credits, 5 credits, 10 credits, 50 credits, etc. (or any user-specified amount, usually up to a maximum amount permitted, e.g., 100 credits), but the player may also be allowed to select what the denomination is for each credit, i.e., the value of each credit. For example, each credit may be worth $1, $0.05, or $0.01. For metering purposes, each such wagering game version may be treated as a separate wagering game requiring separate sets of meters and separate sets of historical data records for each such meter.

For example, if an electronic gaming machine were to offer 50 different general types of wagering game for play, and each such wagering game allowed the user to further select one of 5 different denominations for play, and each combination of wagering game and denomination required 25 meters to be tracked, the electronic gaming machine would need to allocate storage for historical data records for 50×5×25=6250 different meters. If greater numbers of meters were to be tracked (and the 25 meters in this example generally correlates with the minimum number of meters that are required by, for example, the Nevada Gaming Control Board and Gaming Commission, which is a major regulatory body in the wagering game industry—larger numbers of meters could certainly be tracked depending on the desires of the gaming machine manufacturer and/or developer of the wagering games provided thereupon) and/or larger numbers of historical data records for meters than is required by such gaming regulatory authorities, then it is easy to see how available storage space can again rapidly become a limiting resource, even when larger-capacity non-volatile, solid-state storage solutions such as solid state drives or compact flash are used. The techniques for establishing transient meters discussed herein greatly extend the metering capabilities of electronic gaming machines while allowing for much more efficient historical data record storage for those meters.

Historical data for meters may be stored as records in a data structure, such as, for example, a structured query language (SQL) database or other data storage system which may be stored in long-term storage, e.g., on a non-volatile storage device of the electronic gaming machine. Additionally, in some such systems, each such meter record may be digitally signed or encrypted to prevent tampering and provide reassurance that the historical data is authentic; this may further increase the amount of storage space needed to store such historical data. Historical data records may also be timestamped, e.g., may have a field that stores a time associated with when the data for that historical record was obtained, to allow determinations of when each event causing a meter change occurred. It will be understood that in some implementations, the current value of each meter may be stored in a data structure separate from the data structure used to store the historical data records, and that when a new meter value is determined for a meter, the current meter value may be copied into the historical data structure for storage before being overwritten by the new meter value. In other implementations, however, each meter value may be saved to the data structure for storing historical data records after the meter value is determined, and the most recently saved historical data record for each meter may be viewed as the current value of the meter, i.e., the meter and the historical data records for that meter may be stored in a common data structure.

In typical electronic gaming machine systems, each electronic gaming machine is pre-programmed with software that establishes which events to track via associated meters. The number and type of such meters are selected in advance by the gaming machine system designers and/or wagering game designers and the software for providing such meters is then hard-coded into the operating system and/or wagering game software.

The present inventors conceived of a new system for providing meter output on electronic gaming machines that allows for greater flexibility in meter tracking in electronic gaming machines. In gaming machines offering such enhanced metering capabilities, meters may be generally divided into two classes of meters—first meters for which historical records are stored and second meters for which historical records are not stored (or not necessarily stored).

First meters are generally analogous to traditional meters, and may represent data that may be required to be accessible for some time after the events that resulted in such data have occurred, e.g., for audit purposes. As a result, a large amount of non-volatile storage area may need to be pre-allocated to store historical records for first meters. This generally drives first meters to be pre-defined, e.g., hard-coded into the gaming machine platform or operating system software and/or wagering game software, so as to avoid potentially running out of storage space needed to save the desired amount of historical data for each such meter.

Second meters (which may also be referred to herein as "transient meters"), however, may consist of meters that are not hard-coded into the operating system/electronic gaming machine software and/or wagering game software; such transient meters also generally do not require historical records to be stored and therefore do not require pre-allocated amounts of non-volatile storage to be set aside. As noted above, contrary to how first meters are implemented, second meters may be defined using meter definitions that are not set forth in the operating system or the wagering game software. Instead, second or transient meters may be flexibly defined in one or more external meter definition files, e.g., via definitions set forth in an XML file or similar data structure. This allows second or transient meters to be defined (and redefined) without needing to modify gaming machine operating system code or wagering game code. First meters may also be referred to herein as "non-transient" meters since they generally remain unchanged in nature as long as the electronic gaming machine platform or operating system software or wagering game software remains unchanged; gaming machines also store extensive historical data for such non-transient meters and detailed time-based histories of such meters are therefore accessible (it will be understood that while non-transient meters track events for which extensive historical data records may be stored by an electronic gaming machine, such historical data records may nonetheless eventually be deleted, e.g., after such records have been superseded by a threshold number of newer historical records or after a portion of memory allocated for the storage of such data has been completely filled; in this respect, the stored historical data that is eventually deleted may technically be considered "transient," but this is to be understood to not be transient in the sense of a "transient meter," which uses "transient" to refer to the nature of the meter itself, i.e., it is not a meter that is hard-coded into the wagering game software and/or the operating system/electronic gaming machine platform software).

An XML code snippet for a second or transient meter definition for an "AvgPayback" meter may, for example, be "<GameCompositeMeter name="AvgPayback" expression="(TheoPayback/WageredAmount)" classification="Percentage" group="Denomination"/>, which would define a transient meter titled "AvgPayback" (the "GameCompositeMeter" flag may define the following XML code as defining a transient meter, as opposed to some other aspect of gaming machine operation) according to a simple division operation involving the value of a "TheoPayback" meter divided by the value of a "WageredAmount" meter. The "classification" would establish that the meter in question is a percentage meter (as opposed to an incremental or total meter), and the "group" operator would associate the meter in question with a particular grouping of meters. Additional operators may be included in such a definition, such as are discussed in more detail herein, e.g., operators governing transient meter initialization and/or reset parameters.

Electronic gaming machines that are equipped to provide for transient meters may have operating system software and/or wagering game software that includes computer-executable instructions for controlling one or more processors of such electronic gaming machines to access a meter definition file or files, read one or more meter definitions therefrom, and then implement one or more corresponding transient meters based on the definition(s) that are obtained from the meter definition file(s). In many cases, meter definitions for second or transient meters may be based, at least in part, on values of one or more first meters. In that sense, such transient meters may be thought of as being "composites" of non-transient meters in some respects. In some implementations, meter definitions for second or transient meters may also or alternatively be based on the occurrence of events that are detected by an electronic gaming machine. For example, an electronic gaming machine may be configured to register each time a particular player-selectable option is selected in a bonus game as a separate event; such selections may have no corresponding first or non-transient meter that provides any insight as to the occurrence of such events. A transient meter definition may be provided, however, that may establish a transient meter to track such events. For example, the meter definition for such a transient meter may identify the event and may specify the type of meter to be used. Thus, in the above example, the meter definition may simply specify the event name, e.g., "Double-Up Selected," and the type of meter, e.g., incremental. The electronic gaming machine may then establish an incremental meter that is incremented by the electronic gaming machine each time the Double-Up option is selected in the bonus game offered by that electronic gaming machine. In some implementations, meter definitions may be provided that may be based on values from one or more first or non-transient meters and/or one or more second or transient meters. Thus, for example, transient meter definitions could be set forth that establish two transient incremental meters—one that tracks the number of times a player selects any of options A, B, or C in a bonus game, and another that tracks the number of times the player selects option A in the bonus game. A transient percentage meter could then be established through a third meter definition; the transient percentage meter may be defined as the "option A" transient meter divided by the "option A/B/C" transient meter, thus providing a transient meter that tracks the relative frequency with which option A is selected by users of the electronic gaming machine. It will be understood that in some implementations, a meter definition may also include initialization and/or reset information or rules. For example, a meter definition may specify that the corresponding meter is to be reset or initialized to a particular value, e.g., zero, when a particular event occurs, e.g., when the electronic gaming machine is rebooted or when an access door of the electronic gaming machine cabinet is opened.

The operating system and/or wagering game software for such an electronic gaming machine may include program modules to facilitate implementing such meters, e.g., program modules implementing one or more equation parsing subroutines that may be used to parse the second meter definitions into a format that allows for actual calculation of the expressions defined by the meter definitions. There are a wide variety of such modules, which may be referred to as "expression parsers" or "equation parsers" in the computer programming field, that may be used to provide such functionality—one example of such an expression parser is the CodeDom library offered by Microsoft as part of the .NET framework, which provides the CodeDomProvider.Parse method that can receive as input a text string representing a mathematical/code expression, compile it, and then execute the compiled expression from within another program. Similar such expression parsers may be found, for example, in spreadsheet applications, database query engines, CAD programs, and other software in which mathematical expressions may be entered by a user in the expectation that the software will resolve the mathematical expression and deliver the result thereof. An example second meter definition, for example, may be "SecondaryWonCount+SecondaryLostCount+SecondaryTiedCount," which may define a transient meter for the number of secondary outcomes provided by the electronic gaming machine by summing non-transient meter values for the number of times a secondary outcome in a wagering game resulted in a win, loss, or tie.

In a further example, an electronic gaming machine may include among its first meters a total coin-in meter and a total coin-out meter. The total coin-in meter may track the total amount of credits wagered by players on a wagering game offered by the electronic gaming machine since a predetermined point in time, and the total coin-out meter may track the total amount of credits that are paid out to players of that wagering game since that predetermined point in time. As both amounts may need to be verified for any given play of a wagering game in case there is a dispute by a player, extensive historical data records for each meter may be maintained by the electronic gaming machine for auditing purposes. Such an electronic gaming machine may also, however, provide a transient return-to-player (RTP)

meter that reports the percentage of total coin-in to coin-out for a given interval of time. The transient RTP meter may, for example, be defined by a meter definition in a meter definition file that sets forth a machine-readable expression that defines the transient RTP meter as the ratio of the coin-out meter to the coin-in meter. Thus, at any given instant in time, the electronic gaming machine may maintain a transient RTP meter value that is determined by referencing the values of the coin-out and coin-in meters at that moment.

Figure 8:
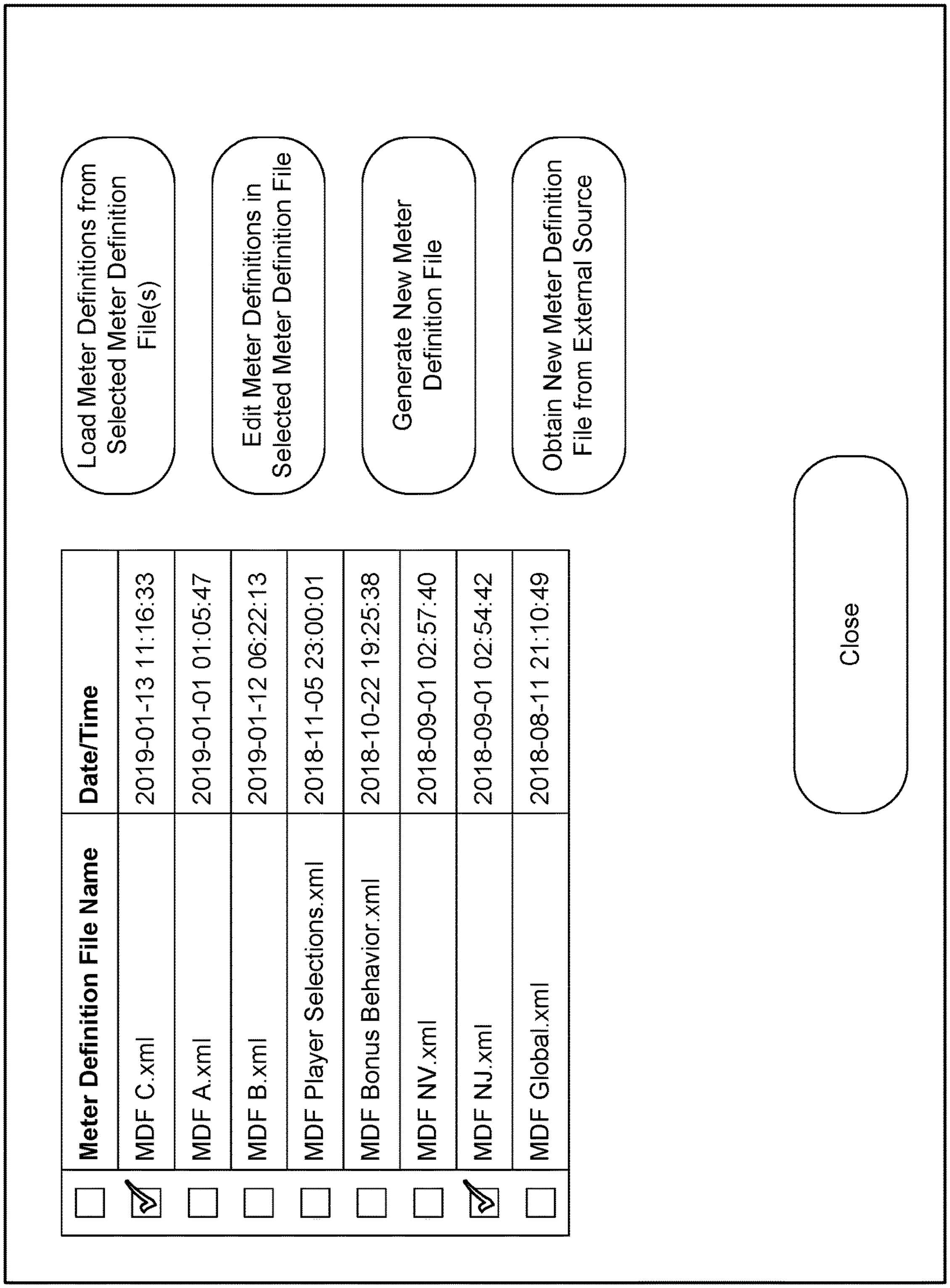
FIG. 8 depicts an example GUI that may be generated by an electronic gaming machine in order to allow meter definition files to be selected for use.

In some implementations, an electronic gaming machine may include one or more interfaces for generating or receiving one or more meter definition files. In some implementations, an electronic gaming machine may be configured to provide a meter definition graphical user interface (GUI) that may be accessed, for example, via an administration options screen of the electronic gaming machine. Such a meter definition GUI may include, for example, user-selectable controls for reviewing the meter definition files stored on the electronic gaming machine and selecting one or more of such meter definition files to be used by the electronic gaming machine to produce one or more corresponding transient meters. In some implementations of the meter definition GUI, user-selectable controls may be included that allow a user to generate a new meter definition file (or to select an existing meter definition file) and edit the contents thereof so as to provide one or more transient meter definitions. For example, FIG. 8 depicts an example GUI that may be generated by an electronic gaming machine in order to allow meter definition files to be selected for use. On the left side of the GUI is a list of available meter definition files, including the file name for the meter definition file, a date stamp, and a selection checkbox that allows particular meter definition files to be selected or unselected. In this example, there are eight meter definition files available on the electronic gaming machine, but more or fewer may be available on electronic gaming machines depending on how they are provisioned. On the right side of the GUI are provided four selectable buttons. The topmost button may, when selected, cause the electronic gaming machine to load the meter definitions from the meter definition file(s) selected from the list at left. The next two buttons may allow the user to edit a selected meter definition file or generate a new meter definition file, respectively. The last button on the right side may, when selected, may cause the electronic gaming machine to initiate transfer protocols needed to obtain a new meter definition file from an external source. For example, such a transfer protocol may cause the electronic gaming machine to request a meter definition file update from a centralized server over a network, place the electronic gaming machine into a mode where one or more wireless communications interfaces of the electronic gaming machine may be active and may be used by the electronic gaming machine to receive such a meter definition file wirelessly, e.g., from a nearby smartphone, tablet, or other portable electronic device, or scan, for example, a machine readable code (such as, for example, a QR code) that encodes the meter definition file in an optical machine-readable format. Such GUIs may be accessed by technicians when servicing an electronic gaming machine, although in some additional or alternative implementations, the electronic gaming machine may be caused to obtain such meter definition files through automatic means or through prompting received by an external device, e.g., a smartphone, tablet, or other computing device.

The GUI of FIG. 8 may also have a "close" button that may be used to exit the GUI and return, for example, to a general administration GUI for the electronic gaming machine.

Figure 9:
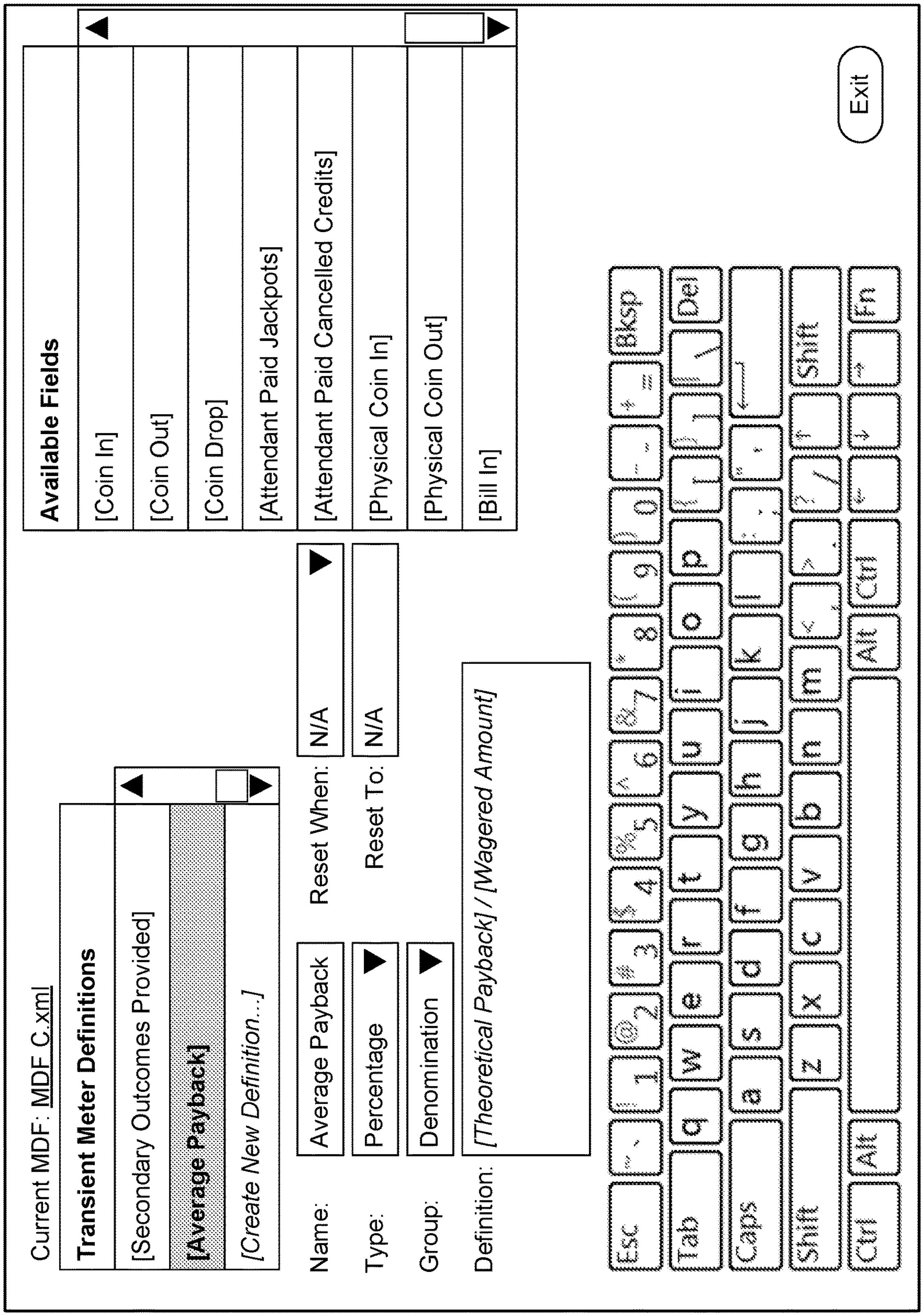
FIG. 9 depicts another GUI that may be provided by an electronic gaming machine to allow for editing or creation of a meter definition file via the electronic gaming machine.

FIG. 9 depicts another GUI that may be provided by an electronic gaming machine to allow for editing or creation of a meter definition file via the electronic gaming machine. Of course, meter definition files may also be created externally to the electronic gaming machine, e.g., using an editor on a remote device, and then provided to the electronic gaming machine via a communications interface, as discussed above. In FIG. 9, however, a variety of selectable interfaces are provided. In the upper left corner, a currently selected meter definition file (MDF) is indicated; this is the meter definition file for which editing is being performed. Located below the selected meter definition file field is a list of transient meter definitions contained within that meter definition file; a particular meter definition in the list may be selected, as indicated by the highlighted "[Average Payback]" meter definition, in order to edit that meter definition (or "Create New Definition . . . " may be selected to create an entirely new meter definition in that meter definition file). The "Name," "Type," and "Group" fields located immediately below the meter definition list may indicate, and may be used to edit, the name of the meter definition (for example, how it may be referenced by other meter definitions and/or how it will be titled when output to a user), the meter type (for example, incremental, total, or percentage), the meter group (e.g., a group associated with the meter definition, such as may be useful for organizing meter data later). One or more input devices may be provided to allow for interaction with such GUIs, e.g., an on-screen keyboard such as shown at bottom in the GUI of FIG. 9.

A "Definition" field may be provided that may allow a user to enter an expression defining a second or transient meter definition. In this example, the transient meter definition that is entered is an expression relating two meter amounts to one another: [Theoretical Payback]/[Wagered Amount]. In some implementations, a listing (see upper right) of the fields available for inclusion in a meter definition may be provided; such fields may include, for example, transient and/or non-transient meters or event types. In implementations that have such fields listed, the GUI may be configured to allow a field selected from the list to be inserted into the meter definition field at a cursor location to facilitate construction of a meter definition.

Also shown in the GUI of FIG. 8 are "Reset When" and "Reset To" fields that may be used to specify, if needed, meter reset conditions and reset values for a given meter definition. In this example, the two values for these fields are "N/A" since this percentage meter does not have any reset conditions (its value would depend directly on the values of the two other meters specified), but other meter definitions may include reset conditions that cause such meters to reset when a particular event occurs, e.g., gaming machine reboot, a door on the gaming machine cabinet being opened, a progressive jackpot award being won, etc.

Returning to the transient RTP meter discussed above, while extensive historical data values for the transient RTP meter may not be maintained, the transient RTP meter values at any instant in time are derivable from the corresponding values of the two first meters discussed above, for which extensive historical data values are maintained. The transient RTP meter may thus be considered to be a "derivable" transient meter, i.e., directly determinable from one or more first meters (or from the historical data values stored therefor), which may allow for all of the auditing functionality of a "traditional" meter for which extensive historical data is stored, but without incurring the non-volatile storage penalty that long-term storage of meter values typically incurs. Other types of transient meters may be non-derivable, e.g., may reflect parameters that cannot be derived for past time periods based on historical data, such as may be the case if a parameter used to determine such a transient meter does not have historical records stored therefore. In some implementations, none of the values for the non-transient meters may be unambiguously derived from any other non-transient meters; such implementations may provide for the lowest amount of storage space necessary for historical records of non-transient meters, as any meter that can be derived from one or more non-transient meters may take the form of a transient meter.

Traditional gaming machines typically use non-transient meters to track parameters for regulatory compliance and dispute resolution, although if sufficient long-term storage is available, many gaming machines may also include some non-transient meters that may track parameters or events that may be of interest to gaming machine operators, e.g., casinos. Such parameters may include items such as play session duration for each player (for example, how long each individual player plays on the gaming machine before leaving the gaming machine), length of time in between gaming sessions (during which the gaming machine is idle), and other parameters that may give the gaming machine operator more insight as to how well the gaming machine is being utilized.

Electronic gaming machines that implement transient meter systems provide a mechanism for a large number of additional parameters to be tracked—parameters that may be of particular interest to gaming machine and wagering game designers and manufacturers, but which may be of little or no interest to regulatory agencies and of little or low interest to gaming machine operators. For example, many wagering games may present players with various types of gaming experiences, e.g., different game outcomes, different player-selectable choices, different bonus game options, different denomination selections, different payline selections, number of times a player accesses a help screen, the frequency with which a player selects a particular symbol type, etc. Such statistics may provide valuable insight to wagering game and gaming machine designers as to which features of a game or gaming machine are of particular interest to players (or, conversely, which are not of particular interest to players), whether or not a wagering game is perhaps too complex (for example, if the frequency with which the help screen for a wagering game is accessed is high, this may indicate that playing the game is too difficult or confusing), etc.

By dynamically defining transient meters using meter definitions set forth in a meter definition file or files, it is possible to modify or replace an existing transient meter with another type of transient meter or meters, allowing wagering game or gaming machine designers to measure and analyze different aspects of wagering games over time without needing to generate new operating system, platform, or wagering game software (all of which may then need to be re-certified by relevant regulatory authorities prior to installation on an electronic gaming machine). Instead, the transient meter definition file or files may simply be replaced or loaded onto an electronic gaming machine, and the electronic gaming machine may then access those meter definition files and initialize the second meters defined therein.

It will be understood that some implementations of electronic gaming machines with transient meter capabilities may be configured to store historical data for such transient meters to some extent, although such historical storage may be typically much less far-reaching than the extent to which historical data is stored for traditional meters (or non-transient meters). For example, some electronic gaming machines may, for various reasons, store historical data for one or more transient meters for between one and ten or one and one hundred records, or, for example, for a number of records that is less than, for example, 10%, 20%, 30%, 40%, or 50% of the number of records that are, on average, maintained for the non-transient meters of the electronic gaming machine; alternatively, this percentage may be of the average maximum number of records that may be maintained (for example, if a gaming machine is configured to store, on average, up to 1000 historical records for each first meter, then the average maximum of historical records that may be stored for each second meter may be, for example, 100 records). In some implementations, some transient meters may not have any historical data stored by the gaming machine as the transient meter historical data may be derived from the non-transient meter historical data at any time or may, in some instances, simply not store data that is derivable from the historical data at all (for example, if a transient meter is used to monitor an aspect of game play that is of interest to developers but which may not be important enough to warrant historical record storage, then a transient meter that simply tracks that event continuously, without storing historical data, may be sufficient—although it will be recognized that such types of transient meters may not be able to be implemented in a manner that allows for on-demand calculation at a later time (they would, instead, need to be maintained continuously)).

In various implementations, electronic gaming machines with transient meter capabilities may be configured to store up to an average maximum of M historical records for non-transient meters and an average maximum of N historical records for transient meters. When a gaming machine's historical data is first populated, it will, of course, store less than the maximum number of records allowed for any particular meter, but, as the gaming machine remains operational for longer and longer periods of time, the number of historical records stored for each meter may increase until the maximum allowed for each particular meter is attained. Different transient and non-transient meters may have different maximum numbers of historical records that may be stored, but the assorted different maximum numbers of historical records that may be stored for all of the transient meters or all of the non-transient meters may be averaged to provide respective average maximum numbers of historical records across the population of transient or non-transient meters. For example, if there are 20 non-transient meters including 10 non-transient meters for which 5000 historical records apiece are stored and 10 non-transient meters for which only 1000 historical records apiece are stored, then the average maximum number of records for the non-transient meters in this example would be 3000; the transient meters, of course, may have a different average maximum number of historical records stored. Generally speaking, M will be a positive integer, N will be a non-negative integer (which may, in some cases, be zero), and N will be smaller than M, i.e., $N<M$, although it will also generally be the case that $N \ll M$.

In some such implementations, as noted above, N may be zero, i.e., no historical records for transient meters may be stored. In other implementations, N may be a very low number, e.g., in the single digits, such as 1 or 2, to allow for transient meters that may include the one or more previous values of a transient meter to be included when determining the current value of the transient meter. M, correspondingly, may be much higher, e.g., on the order of 10, 20, 30, 50, 100, etc. In some implementations, N may be less than $$\frac{M}{2}, \frac{M}{4}, \frac{M}{6}, \frac{M}{8}, \text{ or } \frac{M}{10}.$$

In some implementations, the oldest historical records for a given non-transient meter may be overwritten to make space for the most recent historical records for that non-transient meter. It should be understood that particular implementations need not necessarily be bound by the above constraints—such examples are merely provided to highlight that if historical records are stored for transient meters, the extent to which such records are retained may differ by a wide margin as compared with the extent to which historical records are stored for non-transient meters.

Figure 3:
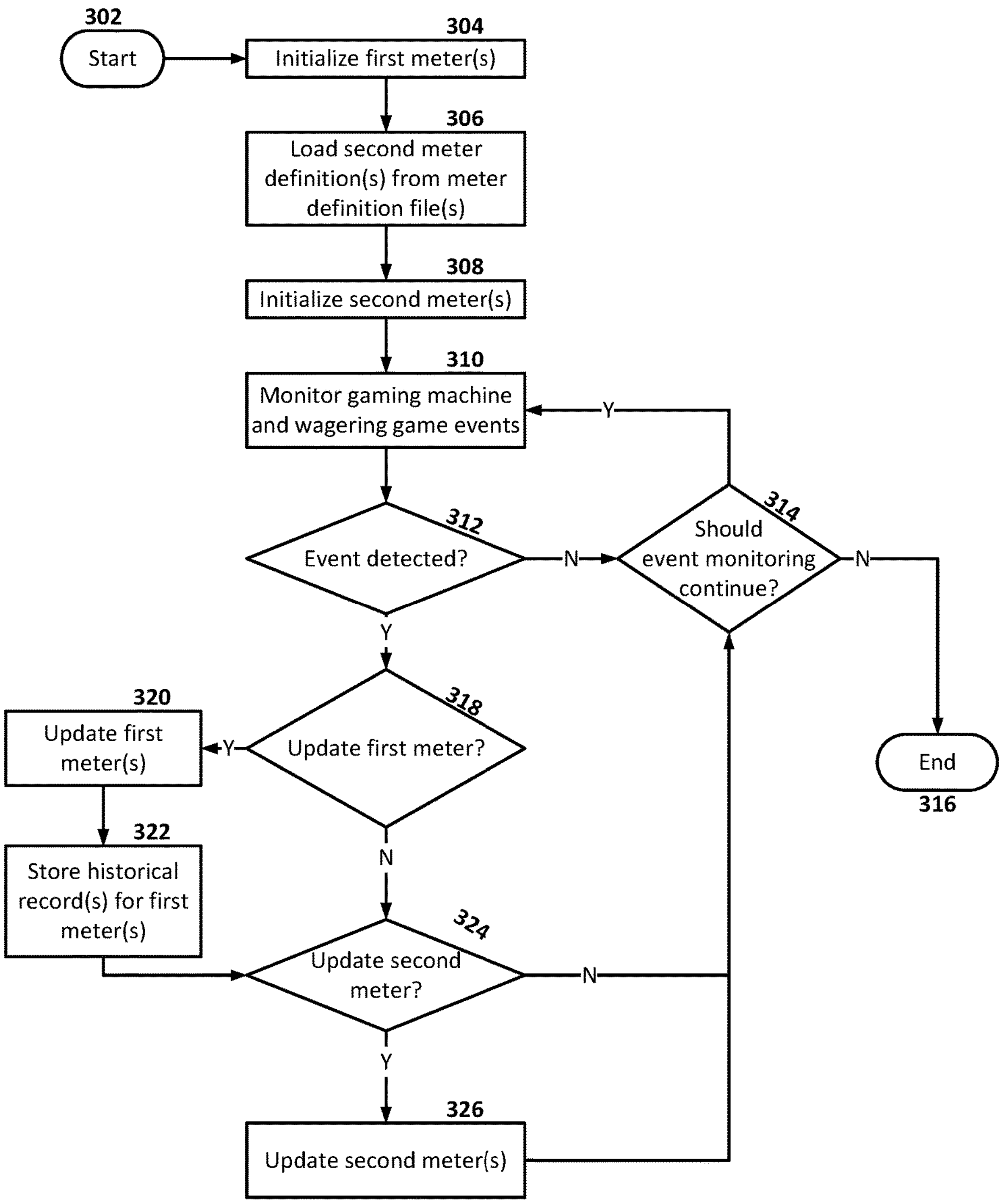
FIG. 3 depicts a flow diagram of a technique for providing transient and non-transient meters on an electronic gaming machine or system.

FIG. 3 depicts a flow diagram of a technique for providing transient and non-transient meters on an electronic gaming machine or system. In block 302, the technique may begin, e.g., as part of the electronic gaming machine boot process or during the loading of a wagering game offered by the electronic gaming machine. In block 304, one or more first meters may be initialized. Each such first meter may be initialized in a suitable manner. For example, some first meters may reflect "lifetime" parameters, e.g., total games played over the lifetime of the electronic gaming machine (much like an odometer reflects the total lifetime mileage of a car), in which case "initialization" may consist of simply updating the value for such a first meter with the most recent value stored therein (or leaving the current value of such a first meter alone). Other first meters, for example, may track the behavior of a particular parameter relative to a particular instant in time, e.g., the number of games played since the electronic gaming machine was last booted up or the number games played since the last time a door close event was detected. For such first meters, initialization may include resetting the first meter in question to a predetermined value, e.g., zero. In some instances, first meters (and second meters, for that matter), may be re-initialized at various times and independently of other first or second meters.

In block 306, one or more second meter definitions may be loaded or read from one or more meter definition files, which may, for example, contain expressions or rules governing the calculation of various second meters. These expressions or rules may include mathematical expressions allowing the value of a second meter to determined or derived from the value of one or more of the first meters and they may be formatted in a manner that facilitates parsing of the meter definitions such that the definitions can be transformed into mathematical expressions allowing for the value of each second meter to be determined based on the events tracked by the electronic gaming machine. In block 308, the one or more second meters may be initialized. In some instances, such initialization may be similar in nature to that of the first meters. In some instances, initialization of a second meter may, for example, involve processing historical data for one or more first meters or may involve referencing current values for one or more first meters and/or second meters. For example, if a second meter is defined to track the RTP of the gaming machine since the last "door close" event, such a second meter may be initialized by processing the historical data for total coin-in and total coin-out of the electronic gaming machine since the last door close event to obtain a total coin-in and total coin-out since that last door close event and then dividing that total coin-in by that total coin-out.

After the first and second meters have been initialized, the activity of the electronic gaming machine may be monitored by the processor or processors of the electronic gaming machine in block 310 to identify the occurrence of events of interest, e.g., electronic gaming machine events and wagering game events (collectively, gaming system events). If it is determined in block 312 that such an event did not occur, then occurred, a determination may be made in block 314 as to whether further event monitoring should continue; if not, then the technique may end in block 316. If further event monitoring is to be pursued, however, the technique may return to block 310. If it is determined in block 312, however, that an event has been detected, then the technique may proceed to block 318, in which a determination may be made as to whether the detected event is tracked, in some way, by any of the one or more first meters, i.e., does the occurrence of the event necessitate a change in the value(s) of any of the first meters? If it is determined in block 318 that one or more first meters tracks the detected event, then the technique may proceed to block 320, in which the relevant first meter(s) may be updated based on the occurrence of the detected event. For example, if the event is a "play game" event indicating that a bet has been placed on a wagering game and the wagering event has been initiated (for example, by pressing a "Spin" button on the electronic gaming machine), then a "games played" first meter may be incremented by a value of 1 unit. The technique may then proceed to block 322, in which one or more historical records associated with the updated first meter(s) may be stored in the data structure used to retain such historical data; in some implementations, blocks 320 and 322 may be performed in a different order or in parallel.

After blocks 320 and 322 have been performed, or if it is determined in block 318 that the detected event is not tracked by any first meter, the technique may proceed to block 324, in which a determination may be made as to whether the detected event is tracked by one or more second meters. If it is determined in block 324 that the detected event is tracked, in some way, by one or more second meters, then the relevant second meter or meters may be updated based on the occurrence of the detected event. The technique may then proceed to block 314 (or, alternatively, may proceed to block 314 if it is determined in block 324 that the detected event is not tracked by any second meters) to determine if event monitoring should continue.

In some alternative implementations, determinations as to whether a detected event is tracked by a particular first or second meter may be omitted, and all of the first and second meters may be caused to be updated or refreshed based on the event; meters that are not affected by the event should remain unchanged, and meters that are affected by the occurrence of the event should be updated/changed based on the occurrence of that event and the historical records for the first meters updated accordingly.

The data associated with the meters of an electronic gaming machine may be handled in a variety of ways. Traditionally, historical data for gaming machine meters was stored on the gaming machine and could be accessed using various specialized interfaces, e.g., via an audit menu or other administrative interface. In some cases, some of the meters of a gaming machine were shown on the gaming machine in a human-readable format with values that were updated in real time; in some cases, this was for regulatory compliance. In yet other or additional instances, gaming machine meter data may be transmitted, at least in part, via a network to a centralized server or gaming machine management system, which may track various meters for gaming machines that it monitors.

With the introduction of transient meters, the number of meters that may be tracked by a gaming machine may be significantly higher than in traditional gaming machines. Moreover, there may be a large number of such transient meters that may be of interest to gaming machine and wagering game developers but which may not be of interest to gaming machine operators or gaming machine regulators.

There may therefore be little incentive for gaming machine operators to provide easy access to the data for such meters, as they derive little direct benefit from doing so—and providing such access may interfere with revenue generation via the gaming machines. For example, if meter data is obtained from an electronic gaming machine via the help GUI, this means that a technician would need to be sitting at the gaming machine, interacting with the help GUI (thus precluding a patron from using the gaming machine to play a wagering game). If meter values are displayed in real time, this a) takes up display real estate, b) may be unattractive, and c) may divulge information that it would be preferable to avoid making easily accessible to the public.

In view of these issues, some electronic gaming machines implementing transient meter systems may also incorporate non-traditional meter output mechanisms to facilitate data retrieval by gaming machine manufacturers or wagering game developers. In some implementations, for example, an electronic gaming machine may provide meter data via one or more machine-readable interfaces for one or more meters monitored by the electronic gaming machine. Such machine-readable interfaces may allow a technician to obtain meter data directly from such an electronic gaming machine without, for example, interrupting game play and with very little impact on the look and feel of the wagering game.

For example, some electronic gaming machines may monitor a plurality of meters and may, at regular intervals (or, for example, whenever a meter value changes), convert the meter values into a machine-readable format, such as a quick-response (QR) code. For example, a 177×177 square QR code may store approximately ~3000 bytes of information, which may be enough to contain meter values for ~750 meter values (assuming each meter value is ~4 bytes in size). These QR codes may be displayed on a display of the electronic gaming machine, either on one of the main displays or on an auxiliary display. In some implementations, such QR codes may be displayed on a dedicated diagnostic or meter display that is separate from other displays of the electronic gaming machine and which may, for example, be located such that they are not visible to casual observers. For example, such a dedicated display may be located on the underside of the button deck of a gaming machine, making it easy to scan by a reader device (such as a tablet or cell phone with a camera) held underneath the button deck, but generally being non-visible to players of the electronic gaming machine. In some implementations, the electronic gaming machine may be configured to determine multiple QR codes, each for a different set of meters that it tracks, and then display those QR codes either simultaneously or sequentially. It will be appreciated that other types of optical labels other than QR codes may be used as well, such as linear bar codes or additional types of two-dimensional or matrix-type bar codes other than QR codes, in the techniques discussed herein, both in the paragraphs above and in the following paragraphs.

In some embodiments, an electronic gaming machine may convert non-transient meter data and/or historical data therefor and any transient meter definition files that may be present on the electronic gaming machine into a machine-readable format. This may facilitate the scan of the non-transient meter data and/or the historical data therefor and the transient meter definition file(s) by an external reader device, e.g., by a remote computing device, a cell phone, a tablet computer, etc., which can then display a complete listing of the non-transient meters and transient meters that are present on the electronic gaming machine. In some implementations, such machine-readable data may be provided by the electronic gaming machine to an external reader or device via wireless or wired transmission, e.g., through a wireless signal, via a USB cable or other wired connection, etc. In some embodiments, one or more, or all, of the transient meters on a particular electronic gaming machine may not be known by the operator of the reader device until the reader device scans the machine readable code containing the transient meter definition files and the non-transient meter data from the electronic gaming machine, derives the transient meter data from the transient meter definition files and non-transient meter data, and then displays the transient meters to the user.

In some such implementations, the data that is formatted in a machine-readable format and which may be provided to the external reader or external device may include at least some historical data for one or more transient meters as well, allowing the reader device to similarly derive the values of such transient meters using the historical data therefor and the transient meter definitions defining those transient meters.

Figure 4:
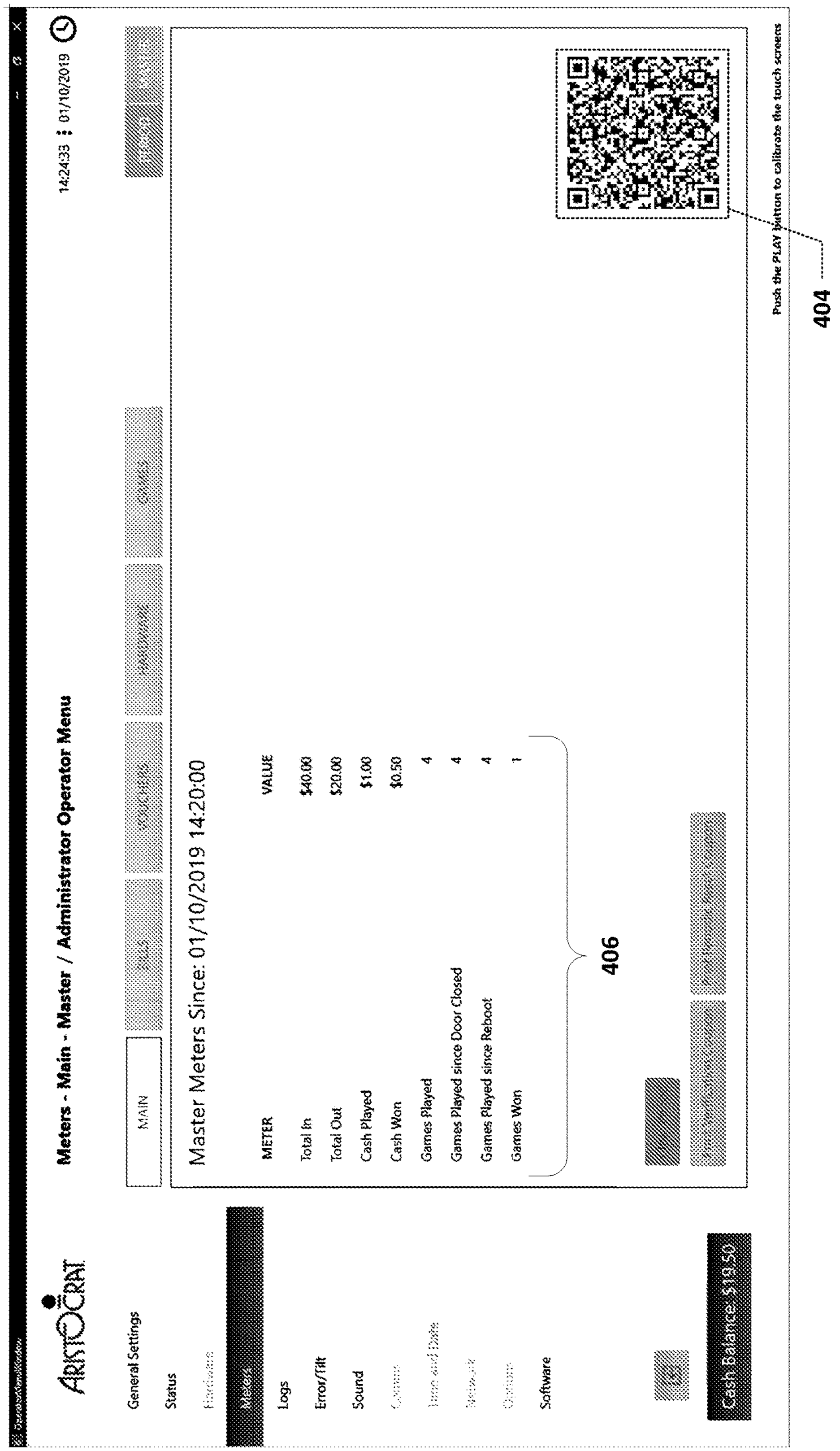
FIGS. 4 and 5 depict example administrative interfaces for electronic gaming machines that may be used to access meter information.
Figure 5:
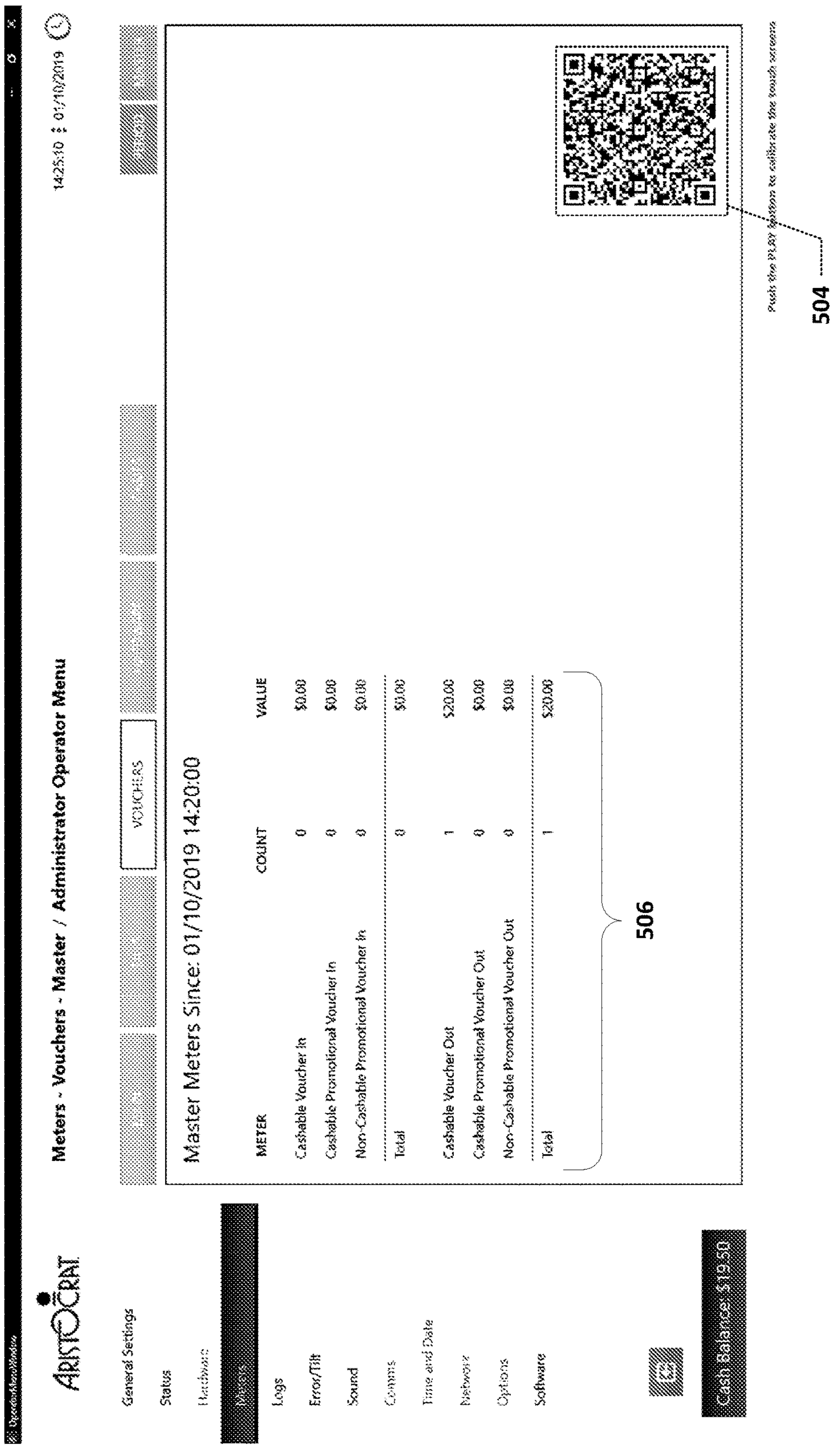

FIGS. 4 and 5 depict example administrative interfaces for electronic gaming machines that may be used to access meter information. In addition to the human-readable meter information 406 and 506 depicted in both interfaces, each interface may also include a QR code 404 or 504 that may contain meter information as well (including, for example, the meters 406 and/or 506, as well as other meters that may not be shown in plaintext at all).

In some other electronic gaming machines, meter data may be encoded in a manner that allows it to be displayed via the main display or displays of the gaming machine and readable by a machine reader but effectively invisible to humans. For example, meter data may be encoded into a graphical image or series of images, e.g., an animation, using steganographic techniques that "hide" the data within an image or images to be displayed on the electronic gaming machine display. Another technique that may be used to communicate such data is described in U.S. Pat. Nos. 9,022,291 and 9,022,292, which are hereby incorporated herein by reference in their entireties and for all purposes. Such a technique may involve displaying a machine-readable data construct, e.g., a QR code, on a display, but in a way that makes it invisible to a human observer while still visible to a machine vision system having a sufficiently high scan rate.

For example, a region of a display may display an image, e.g., multimedia content for a wagering game. The electronic gaming machine may cause pixels within that region to change state to show a QR code containing meter data for a split second, e.g., for a single frame duration in an animation. The electronic gaming machine may then cause those same pixels to display, for example, a negative image of that same QR code immediately after the first display of the QR code. If the durations of both displays of the QR code are sufficiently short, e.g., 1/60$^{th}$ to 1/120$^{th}$ of a second each, then the color content of the two QR codes may, to the human eye, become temporally averaged into a uniform-colored square area. By adjusting the colors used for each pixel in the QR code, it may be possible to have the temporal average for each pixel match the original pixel color of the underlying image in the same location—thus, the human eye may see the underlying image and observe no trace of the QR codes embedded therein, a machine vision system, which may have a scan frequency of more than 60 Hz, for example, may be able to discern separate frames of image data and then identify the QR codes embedded therein based on the image contrast in each frame.

Figure 6:
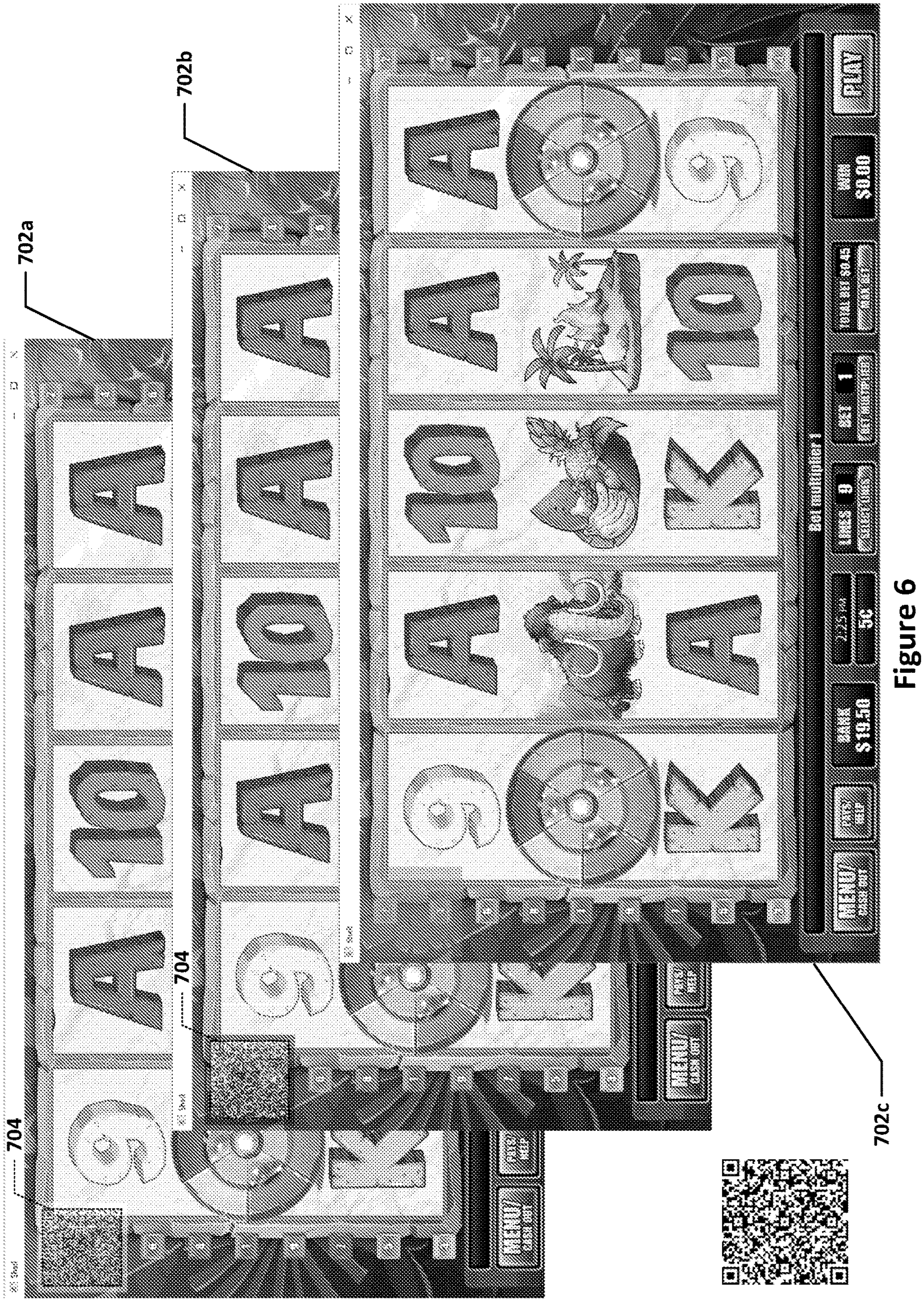
FIGS. 6 and 7 depict two different examples of hidden QR code displays on a gaming machine interface.
Figure 7:
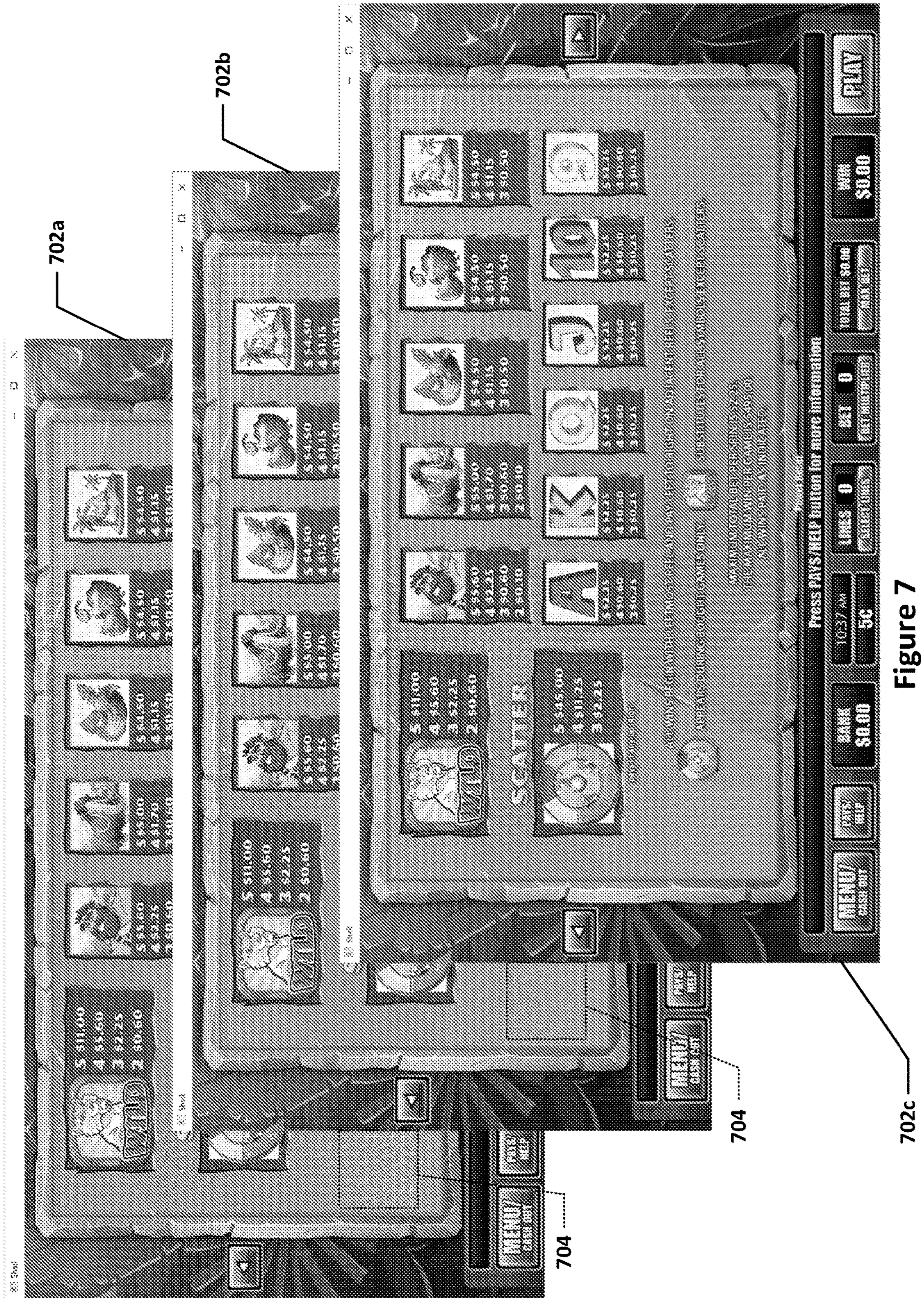

FIGS. 6 and 7 depict two different examples of such hidden QR codes. In FIG. 6, two successive frames 602*a* and 602*b* of a game play screen are shown, with a third frame 602*c* presented in the foreground that is the visual composite of the previous two frames 602*a* and 602*b*. As can be seen, the upper left corner of each frame 602*a* and 602*b* features a QR code 604, but with alternating color schemes—the color schemes may be selected such that the color for each pixel, when the two frames are shown in rapid successions, e.g., at a speed of 30 or 60 frames per second, averages out to the color of that pixel in the frame 602*c*, giving the appearance, to a human observer, of the graphical content of frame 602*c* and rendering the QR code invisible to the human eye. A digital camera, however, may have a much higher sampling rate than the human eye and may therefore be able to discern the QR codes and decode them, thereby extracting the information encoded therein, e.g., meter information.

In FIG. 7, a similar arrangement may be seen, except that instead of the QR code being displayed in a game play screen, the QR code is instead displayed in the "help" interface. In FIG. 7, two successive frames 702*a* and 702*b* of a help screen are shown which, when displayed in quick succession, may optically combine to present composite frame 702*c* to a human observer. This may make the meter data slightly more difficult to obtain, as it may only be reachable in some such implementations when the help screen is visible—which may require that the person obtaining the data be using the electronic gaming machine (or may require that the person playing happen to access the help screen while the person trying to obtain the meter data is present). In some implementations, meter data may always be displayed via hidden (or even non-hidden) machine-readable codes, e.g., QR codes, regardless of what mode the electronic gaming machine is in.

It will be understood that such QR codes may instead be other types of machine-readable content, e.g., bar codes, plaintext, etc.

In some implementations, visual techniques may be used to communicate meter data from an electronic gaming machine using visual elements that are not part of the electronic gaming machine displays. For example, an electronic gaming machine may include one or more infrared light-emitting diodes, separate from the displays, that may continuously and repeatedly transmit meter data from the electronic gaming machine to an external device (if present). In such implementations, the meter data may be encoded in a machine readable format suitable for transmission via infrared light emission and the encoded information may then be emitted by the one or more infrared light-emitting diodes of the electronic gaming machine and then received by a remote device, e.g., a hand-held data reader operated by a technician.

In some implementations, non-visual communication of meter data may be provided by gaming machines. For example, in some instances, an electronic gaming machine may be configured to transmit meter data through audio channels or through other wireless mechanisms. For example, an electronic gaming machine may include a speaker that may be configured to emit the meter data by encoding it in a high-frequency audio stream that may be played back by the speaker of the electronic gaming machine. Such audio broadcast may be effectively at a higher frequency than can be commonly heard by the human ear, and may thus be relatively imperceptible to players of the electronic gaming machine. However, a reader device may have a microphone pickup with a higher frequency sensitivity that may be able to detect the encoded data transmission, allowing the reader device to record the encoded data and allow for it to be decoded and stored on the reader device.

A further technique that may be used to transmit meter data is wireless broadcast using radio-frequency techniques. For example, a low-power radio frequency device, e.g., a device such as a near-field communications (NFC) device, may be used to broadcast meter data such that it may be detected and read by a nearby reader device, e.g., a device carried or held by a technician.

In each such technique discussed above, the transmission of meter data may occur continuously and automatically during operation of an electronic gaming machine. In this sense, such gaming machines may transmit data in an open loop fashion, e.g., without any input from an external device (this may avoid introducing the possibility of a security vulnerability that may arise from a communications pathway into the electronic gaming machine). However, it will be understood that some electronic gaming machines may be configured to only provide such meter data transmission in response to receipt of one or more commands from an external source, responsive to particular actions taken on the electronic gaming machine, or perhaps only when certain conditions are met, e.g., during a particular time of day.

In some implementations of electronic gaming machines featuring transient meter systems and mechanisms for communicating meter data from the electronic gaming machine to an external device, e.g., a portable reader carried by a technician, the meter data that is communicated out of the gaming machine may be transmitted or communicated in tandem with additional non-meter information, e.g., information such as identification information (such as a serial number) that uniquely identifies the electronic gaming machine, wagering game software version number or numbers, gaming machine platform software or operating system software version number, and/or second meter definition version number. Such additional information may allow for more flexibility in filtering and analyzing the meter data that is collected from such gaming machines.

As mentioned above, second meter definition files on a gaming machine may be periodically updated or changed to track new events or to change how existing second meters are determined. As such second meters are newly defined or redefined, the data that is output by the electronic gaming machine reflecting such second meter values may change as well. In some implementations, each second meter value transmitted by an electronic gaming machine may be transmitted in association with a field descriptor or other identifier that provides sufficient information to allow the nature of the second meter to be determined by the receiving device (or another device that is eventually provided with the data collected from the electronic gaming machine). In some implementations, however, second meter data may simply be encoded as bare data, i.e., without any explicit identifier or other information that would identify which second meter each value is associated with (or even, in some cases, where each second meter value starts and ends in the encoded datastream. In such implementations, the second meter definition file or files (or a related file provided on the electronic gaming machine) may include additional information, in addition to the second meter definitions, to the electronic gaming machine that instructs the electronic gaming machine in how to encode or package the values of one or more second meters (and, optionally, one or more first meters) for communication to an external device.

For example, such output formatting information may include instructions to the electronic gaming machine to concatenate the values of 40 second meters together into a single string with pre-arranged delimiter characters inserted between each such value, or to concatenate the values of such second meters together after padding each such value with leading zeros until it is 8 digits long. Such formatting information may also specify the order in which the second meter values are to be arranged during the concatenation process. Each such instance of output formatting information may be assigned with a unique identifier of some sort that may be located, for example, in the same location of the datastream used to transmit the meter data and then used by a device that receives such a datastream to determine how the meter data is formatted, e.g., by looking up the identifier in a database that lists the data formatting conventions associated with each identifier. Once the receiving device can identify how the data is formatted, it may extract the meter data according to the specified formatting conventions. Such systems may allow for meter data to be transmitted by an electronic gaming machine in a relatively open manner, e.g., such that no authentication, login, credentials, or other administrative options need to be supplied, without necessarily allowing a receiving device to be able to read the broadcast data in a meaningful way (unless the receiving device has access to information that allows the format of the data to be determined). In some implementations, the data may be additionally or alternatively encrypted prior to transmission, e.g., using public/private key encryption, such that the encrypted second meter data may only be decrypted by an entity having the corresponding decryption key, e.g., the private key of a public/private key pair. Such techniques may allow for large amounts of meter information (including first meter and/or second meter values) to be easily retrieved from electronic gaming machines by technicians or other personnel without, in some instances, even requiring physical access to the electronic gaming machine. This may greatly enhance the capabilities of electronic gaming machine designers and wagering game designers to obtain meaningful information regarding various aspects of a wagering game or an electronic gaming machine in a way that does not impact gaming machine operator profitability, gaming machine uptime, etc.

It will be understood that while the above discussion has focused on implementations where second meters are maintained in parallel with first meters during operation of an electronic gaming machine, other implementations of electronic gaming machine may handle second or transient meters differently.

For example, in some electronic gaming machines, one or more second or transient meters may not be maintained at all during normal operation of the electronic gaming machine and may, instead, be evaluated on-demand. For example, if a meter definition file defines one or more transient meters that are all ultimately derivable from the current values of the non-transient meters of the electronic gaming machine, then such transient meter values may not be tracked at all during normal usage of the electronic gaming machine and may instead only be calculated when a specific request for such a transient meter value is received by the electronic gaming machine. For example, the electronic gaming machine may be provided with an instruction, e.g., delivered via a menu selection in a meter definition GUI, to provide one or more transient meters, at which point the electronic gaming machine may load the meter definitions for those transient meters, calculate the values therefor based on current meter values for one or more meters, and then provide output for such transient meters. In some implementations, one or more transient meters may be determined, at least in part, on-demand by retrieving historical data for one or more other meters, e.g., non-transient meters (or other transient meters that have been maintained during operation of the electronic gaming machine and that have had historical data therefor stored to at least some extent), and then determining, on-demand, the values of those one or more transient meters. For example, a transient meter may have a meter definition that defines the transient meter to be a running total of credits wagered since the last time that a "door open" event occurred. In such a case, historical data records for an incremental "door open" meter may be reviewed by the electronic gaming machine to identify the time at which the most recent "door open" meter change occurred (based on a timestamp associated with that meter change); the electronic gaming machine may then evaluate historical data records for a "credits wagered" meter that are associated with timestamps occurring after the timestamp of the most recent "door open" meter change to determine the total amount wagered since the most recent "door open" meter change. On-demand transient meter determination may not always be available for all types of transient meters; for example, transient meters that may track data that is not derivable from non-transient meter historical data, e.g., transient meters that track the occurrence of events that are not logged at all by non-transient meters, may not be able to be determined on-demand since they may require that the occurrence of past events for which no historical data exists be taken into account. In some such implementations, an electronic gaming machine may be configured to continuously maintain transient meters for which values cannot be determined on-demand from historical data records or from current meter values, but may be configured to generate other transient meters on-demand.

In some further additional or alternative implementations featuring on-demand transient meter determination, such determinations may not be performed by the electronic gaming machine at all but may instead be performed by a remote device, e.g., a remote server or a smartphone, tablet, or other computing device that may retrieve the historical and/or current meter data from an electronic gaming machine and may also retrieve from the electronic gaming machine a related meter definition file (or may, for example, retrieve such a meter definition file from another location, e.g., a remote server or from its own memory). In such an implementation, the remote device may analyze the retrieved current and/or historical meter data according to the meter definitions in the meter definition file and augment whatever meter values are retrieved with transient meter data determined therefrom according to the meter definitions.

In view of the above, it will be understood that, at a high level, some implementations of an electronic gaming machine with transient meter functionality may, for example, be configured to monitor electronic gaming machine activity for the occurrence of a plurality of different types of gaming system events that are "meterable" events, i.e., where each occurrence of such a type of gaming system event will affect the value of a meter. Such types of gaming system events may include a first set of types of gaming system events and a second set of types of gaming system events; some types of gaming system events may belong in both the first set of types of gaming system events and the second set of types of gaming system events, whereas other types of gaming system events may belong in only one set or the other.

Each type of gaming system event in the first set may, whenever such a gaming system event occurs, cause the electronic gaming machine to update one or more non-transient meters that track that type of gaming system event in some way and may also cause a corresponding historical data record to be saved to a data structure.

Similarly, each type of gaming system event in the second set may affect the value of one or more transient meters that are each defined by an associated meter definition. Such transient meter determination may, depending on the particular implementation, occur continuously, e.g., in parallel with the non-transient meter updates, or responsive to an explicit request, e.g., a request via a GUI or by an external device to provide transient meter data. In either case, the value of each transient meter may be updated based on the corresponding meter definition for that transient meter and each occurrence of one or more of the types of gaming system events in the second set of the types of gaming system events. This may be the case regardless of whether the transient meter value is determined continuously or on-demand.

Thus, for example, in an electronic gaming machine in which the transient meters are all derivable from the values of some of the non-transient meters and where there are at least some non-transient meters that do not affect the values of any transient meters, the first set of types of gaming system events may include all of the types of gaming system events that are in the second set of types of gaming system events but may also include some types of gaming system events that are not in the second set of types of gaming system events. In such an implementation, the transient meters may be determined either continuously, e.g., in conjunction with the determination of the non-transient meter values, or on-demand at a later time.

In another example, in an electronic gaming machine in which some transient meters are derivable from the values of some non-transient meters and where there are at least some non-transient meters that do not affect the values of any transient meter and at least some transient meters that are not derivable from any non-transient meters, the first set of types of gaming system events and the second set of types of gaming system events may share some types of gaming system events in common but may also each include types of gaming system events that are not in the other set. In such an implementation, the transient meters may be determined either continuously or on demand (if their values are based entirely on the occurrence of types of events that are also in the first set) or continuously (if their values are based entirely on the occurrence of types of events that are only in the second set).

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising:

one or more displays;

one or more credit input devices;

one or more credit output devices;

one or more player input devices;

one or more processors;

one or more storage devices; and one or more memory devices, wherein:

the one or more displays, the one or more credit input devices, the one or more credit output devices, the one or more player input devices, the one or more processors, the one or more storage devices, and the one or more memory devices are operably connected; and the one or more storage devices store computer-executable instructions for controlling the one or more processors to cause the one or more processors to:

present one or more wagering games using the one or more displays, operate the one or more wagering games responsive to inputs received by the one or more player input devices, initialize one or more first meters, monitor activity on the electronic gaming machine for occurrence of any of a plurality of different types of gaming system events in a first set of types of gaming system events, update, responsive to each occurrence of a type of gaming system event in the first set of types of gaming system events, a value or values of at least one of the one or more first meters based on the occurrence of that type of gaming system event, obtain one or more meter definitions from one or more meter definition files, each meter definition associated with a corresponding second meter and defining a corresponding rule for determining a value for the corresponding second meter, initialize the one or more second meters defined by the one or more meter definitions, update a value or values of at least one second meter of the one or more second meters based on the corresponding meter definition or definitions for the at least one second meter of the one or more second meters using, at least in part, one or more values for the one or more first meters, monitor activity on the electronic gaming machine for the occurrence of any types of gaming system events in a second set of types of gaming system events, receive a request to output the values for the at least one second meter of the one or more second meters, and update, responsive to receiving the request, the value or values of the at least one second meter of the one or more second meters based on each occurrence of a type of gaming system event in the second set of types of gaming system events and based on the corresponding meter definition or definitions for the at least one second meter of the one or more second meters using the, at least in part, one or more values for the one or more first meters.

2. The electronic gaming machine of claim 1, wherein the one or more storage devices store further computer-executable instructions for controlling the one or more processors to cause the one or more processors to provide output indicative of the value or values of the at least one second meter of the one or more second meters.

3. The electronic gaming machine of claim 1, wherein the one or more storage devices further store computer-executable instructions for further controlling the one or more processors to:

add, responsive to updating the value or values of the at least one of the one or more first meters, one or more first records to a data structure stored on the one or more storage devices, wherein the one or more first records are each associated with a corresponding one of the at least one of the one or more first meters; and update, responsive to receiving the request, the value or values of the at least one second meter of the one or more second meters based on the corresponding meter definition or definitions for the at least one second meter of the one or more second meters using, at least in part, one or more values for the one or more first meters retrieved from the one or more first records from the data structure.

4. The electronic gaming machine of claim 3, wherein each first record stores data selected from the group consisting of: a value of one of the first meters immediately prior to being updated, the value of one of the first meters immediately after being updated, and a difference between the value of the one of the first meters immediately prior to and after being updated.

5. The electronic gaming machine of claim 1, wherein the one or more storage devices further store computer-executable instructions for further controlling the one or more processors to cause, responsive to each occurrence of any of the types of gaming system events in the second set of types of gaming system events, the one or more processors to update the value or values of the at least one second meter of the one or more second meters based on the occurrence of that type of gaming system event.

6. The electronic gaming machine of claim 1, wherein at least some of the types of gaming system events in either or both of the first set of types of gaming system events and the second set of types of gaming system events are selected from the group consisting of: a hardware failure event, a tamper alarm state change, a door sensor alarm state change, a credit input event, a credit output event, a credit award event, a non-monetary award event, a ticket printing event, a player loyalty program login event, a random number generator outcome, a denomination selection event, a wager amount selection event, a payline selection event, a spin event, a game outcome event, a bonus game event, a player selection of a particular symbol, a player selection of a particular reel stop, occurrence of a predefined winning pattern, occurrence of a predefined set of winning patterns, a winning event with a payout above a first predetermined threshold, a player selection of a double-up, a player selection take win from a double-up win, a player selection of a bonus award type, a player selection to stop the reels, a player selection of a system volume setting, a player selection of a particular game, a player selection of an individual line bet, a player selection of a help screen, and a player selection of a pays screen.

7. The electronic gaming machine of claim 1, wherein the value of each second meter is ultimately derivable from the value or values of at least one of the one or more of the first meters.

8. A method comprising:

presenting one or more wagering games using one or more displays of an electronic gaming machine;

operating the one or more wagering games responsive to inputs received by one or more player input devices;

initializing one or more first meters;

monitoring activity on the electronic gaming machine for occurrence of any of a plurality of different types of gaming system events in a first set of types of gaming system events;

updating a value or values of at least one of the one or more first meters based on each occurrence of a type of gaming system event in the first set of types of gaming system events;

obtaining one or more second meter definitions from one or more second meter definition files, each second meter definition associated with a corresponding second meter and defining a corresponding rule for determining a value for the corresponding second meter;

initializing the one or more second meters defined by the one or more second meter definitions;

updating a value or values of at least one second meter of the one or more second meters based on the corresponding meter definition or definitions for the at least one second meter of the one or more second meters using, at least in part, one or more values for the one or more first meters;

monitoring activity on the electronic gaming machine for the occurrence of any types of gaming system events in a second set of types of gaming system events;

receiving a request to output the values for the at least one second meter of the one or more second meters; and updating, responsive to receiving the request, the value or values of the at least one second meter of the one or more second meters based on each occurrence of a type of gaming system event in the second set of types of gaming system events and based on the corresponding meter definition or definitions for the at least one second meter of the one or more second meters using the, at least in part, one or more values for the one or more first meters.

9. The method of claim 8, further comprising providing output indicative of the value or values of the at least one second meter of the one or more second meters.

10. The method of claim 8, further comprising:

adding, responsive to updating the value or values of the at least one of the one or more first meters, one or more first records to a data structure stored on one or more storage devices, wherein the one or more first records are each associated with a corresponding one of the one or more first meters; and updating, responsive to receiving the request, the value or values of the at least one second meter of the one or more second meters based on the corresponding meter definition or definitions for the at least one second meter of the one or more second meters using, at least in part, one or more values for the one or more first meters retrieved from the one or more first records from the data structure.

11. The method of claim 10, wherein each first record stores data selected from the group consisting of: a value of one of the first meters immediately prior to being updated, the value of one of the first meters immediately after being updated, and a difference between the value of the one of the first meters immediately prior to and after being updated.

12. The method of claim 10, further comprising updating, responsive to each occurrence of any of the types of gaming system events in the second set of types of gaming system events, the value or values of the at least one second meter of the one or more second meters based on the occurrence of that type of gaming system event.

13. The method of claim 8, wherein at least some of the types of gaming system events in either or both of the first set of types of gaming system events and the second set of types of gaming system events are selected from the group consisting of: a hardware failure event, a tamper alarm state change, a door sensor alarm state change, a credit input event, a credit output event, a credit award event, a non-monetary award event, a ticket printing event, a player loyalty program login event, a random number generator outcome, a denomination selection event, a wager amount selection event, a payline selection event, a spin event, a outcome event, a bonus game event, a player selection of a particular symbol, a player selection of a particular reel stop, occurrence of a predefined winning pattern, occurrence of a predefined set of winning patterns, a winning event with a payout above a first predetermined threshold, a player selection of a double-up, a player selection take win from a double-up win, a player selection of a bonus award type, a player selection to stop the reels, a player selection of a system volume setting, a player selection of a particular game, a player selection of an individual line bet, a player selection of a help screen, and a player selection of a pays screen.

14. The method of claim 8, wherein the value of each second meter is ultimately derivable from the value or values at least one of one or more of the first meters.

15. A machine-readable, non-transitory memory device storing computer-executable instructions for controlling one or more processors to cause the one or more processors to:

present one or more wagering games using one or more displays of an electronic gaming machine;

operate the one or more wagering games responsive to inputs received by one or more player input devices;

initialize one or more first meters;

monitor activity on the electronic gaming machine for occurrence of any of a plurality of different types of gaming system events in a first set of types of gaming system events;

update, for each occurrence of a type of gaming system event in the first set of types of gaming system events, a value or values of at least one of the one or more first meters based on the occurrence of that type of gaming system event;

obtain one or more meter definitions from one or more meter definition files, each meter definition associated with a corresponding second meter and defining a corresponding rule for determining a value for the corresponding second meter;

initialize the one or more second meters defined by the one or more meter definitions;

update a value or values of at least one second meter of the one or more second meters based on the corresponding meter definition or definitions for the at least one second meter of the one or more second meters using, at least in part, one or more values for the one or more first meters;

monitor activity on the electronic gaming machine for the occurrence of any types of gaming system events in a second set of types of gaming system events;

receive a request to output the values for the at least one second meter of the one or more second meters; and update, responsive to receiving the request, the value or values of the at least one second meter of the one or more second meters based on each occurrence a type of gaming system event in the second set of types of gaming system events and based on the corresponding meter definition or definitions for the at least one second meter of the one or more second meters using the, at least in part, one or more values for the one or more first meters.

16. The machine-readable, non-transitory memory device of claim 15, wherein the machine-readable, non-transitory memory device further stores additional computer-executable instructions for controlling one or more processors to cause the one or more processors to provide output indicative of the values of the one or more second meters.

17. The machine-readable, non-transitory memory device of claim 15, wherein the machine-readable, non-transitory memory device further stores additional computer-executable instructions for controlling one or more processors to:

add, responsive to updating the value or values of the at least one of the one or more first meters, one or more first records to a data structure stored on one or more storage devices, wherein the one or more first records are each associated with a corresponding one of the one or more first meters; and cause the one or more processors to update, responsive to receiving the request, the value or values of the at least one second meter of the one or more second meters based on the corresponding meter definition or definitions for the at least one second meter of the one or more second meters using, at least in part, one or more values for the one or more first meters retrieved from the one or more first records from the data structure.

18. The machine-readable, non-transitory memory device of claim 17, wherein each first record stores data selected from the group consisting of: a value of one of the first meters immediately prior to being updated, the value of one of the first meters immediately after being updated, and a difference between the value of the one of the first meters immediately prior to and after being updated.

19. The machine-readable, non-transitory memory device of claim 17, wherein the machine-readable, non-transitory memory device further stores additional computer-executable instructions for controlling one or more processors to cause the one or more processors to cause, responsive to each occurrence of any of the types of gaming system events in the second set of types of gaming system events, the one or more processors to update the value or values of the at least one second meter of the one or more second meters based on the occurrence of that type of gaming system event.

20. The machine-readable, non-transitory memory device of claim 15, wherein at least some of the types of gaming system events in either or both of the first set of types of gaming system events and the second set of types of gaming system events are selected from the group consisting of: a hardware failure event, a tamper alarm state change, a door sensor alarm state change, a credit input event, a credit output event, a credit award event, a non-monetary award event, a ticket printing event, a player loyalty program login event, a random number generator outcome, a denomination selection event, a wager amount selection event, a payline selection event, a spin event, a game outcome event, a bonus game event, a player selection of a particular symbol, a player selection of a particular reel stop, occurrence of a predefined winning pattern, occurrence of a predefined set of winning patterns, a winning event with a payout above a first predetermined threshold, a player selection of a double-up, a player selection take win from a double-up win, a player selection of a bonus award type, a player selection to stop the reels, a player selection of a system volume setting, a player selection of a particular game, a player selection of an individual line bet, a player selection of a help screen, and a player selection of a pays screen.

* * * * *